(12) United States Patent
Liu

(10) Patent No.: US 10,054,930 B2
(45) Date of Patent: Aug. 21, 2018

(54) ERROR CORRECTION AMOUNT CREATING DEVICE

(71) Applicant: FANUC Corporation, Yamanashi (JP)

(72) Inventor: Zhaojia Liu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 470 days.

(21) Appl. No.: 14/491,715

(22) Filed: Sep. 19, 2014

(65) Prior Publication Data

US 2015/0094847 A1    Apr. 2, 2015

(30) Foreign Application Priority Data

Sep. 27, 2013 (JP) ................. 2013-202358

(51) Int. Cl.
  G05B 19/404 (2006.01)
(52) U.S. Cl.
  CPC .. *G05B 19/404* (2013.01); *G05B 2219/33036* (2013.01); *G05B 2219/49344* (2013.01)
(58) Field of Classification Search
  CPC ........ G05B 19/404; G05B 2219/49344; G05B 2219/33036
  See application file for complete search history.

(56) References Cited

U.S. PATENT DOCUMENTS

| 2009/0140684 A1 | 6/2009 | Otsuki et al. |
| 2010/0244762 A1 | 9/2010 | Mori et al. |
| 2011/0234142 A1 | 9/2011 | Otsuki et al. |
| 2012/0001583 A1* | 1/2012 | Otsuki ................. G05B 19/404 318/632 |
| 2012/0191238 A1 | 7/2012 | Sakai et al. |
| 2012/0191411 A1* | 7/2012 | Iwasaki ................. G01B 21/20 702/167 |
| 2012/0323373 A1 | 12/2012 | Sato et al. |

FOREIGN PATENT DOCUMENTS

| CN | 102608955 A | 7/2012 |
| DE | 102011012385 A1 | 9/2011 |
| JP | 2009-151756 A | 7/2009 |
| JP | 2010-105117 A | 5/2010 |
| WO | 2011/104757 A1 | 9/2011 |

OTHER PUBLICATIONS

Office Action dated Feb. 17, 2015, corresponding to Japanese patent application No. 2013-202358.
Journal of Technical Disclosure issued Aug. 10, 2009, corresponding to Japanese technical disclosure No. 2009-505137, 7 pages.
Office Action in DE Application No. 102014113705.1, dated Nov. 30, 2016.

* cited by examiner

*Primary Examiner* — Nathan L Laughlin
(74) *Attorney, Agent, or Firm* — Hauptman Ham, LLP

(57) ABSTRACT

In an error correction amount creating device that creates an error correction amount for a five-axis machine controlled by a numerical controller and having three linear axes and two rotation axes, the translation error correction amount and the rotation error correction amount for each lattice point of a lattice region into which a two-dimensional coordinate system space with the rotation axes is divided is obtained from data measured for each position of division of the respective axes and given to the numerical controller.

5 Claims, 29 Drawing Sheets

WHEN A EQUALS 0 DEGREES

WHEN A EQUALS 45 DEGREES

WHEN A EQUALS 90 DEGREES

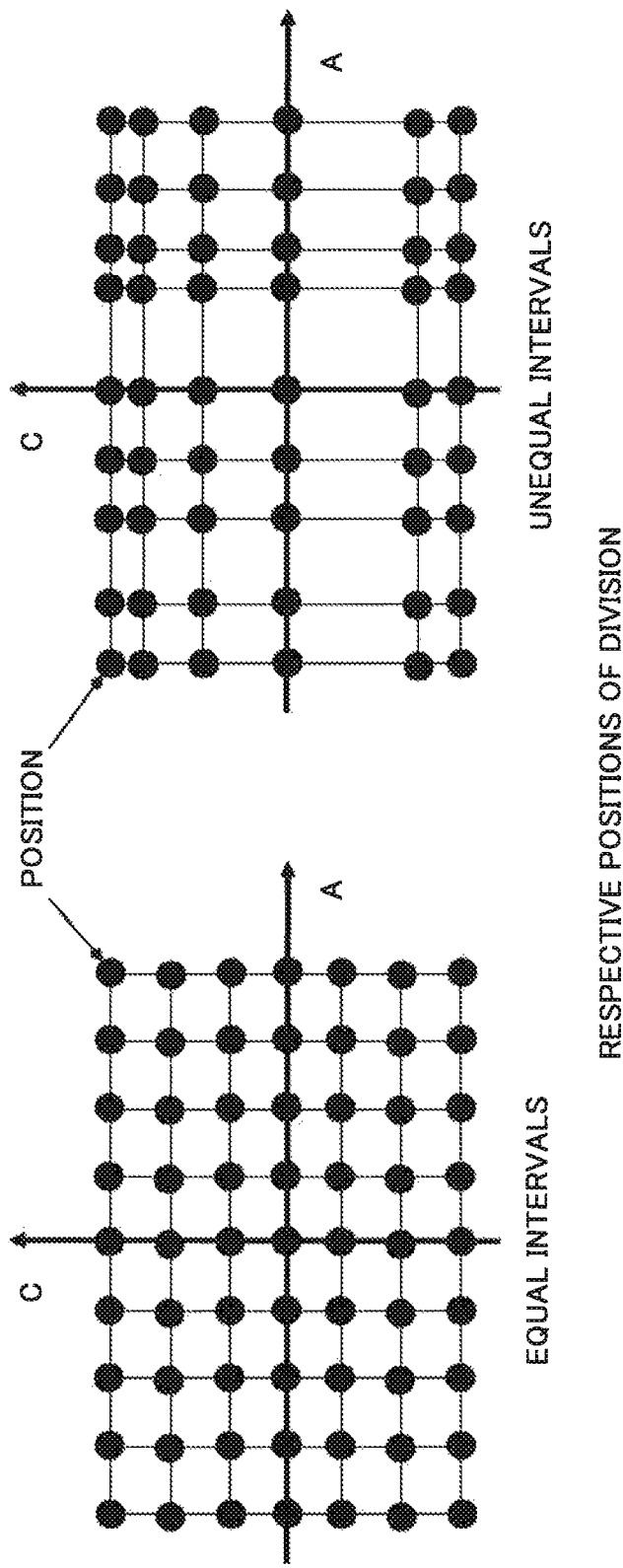

FIG. 3B

| | A-AXIS | | | | |
|---|---|---|---|---|---|
| | a1 DEGREES | ... | 0 DEGREES | ... | am DEGREES |
| c1 DEGREES | $\begin{bmatrix} EXA_{a1} \\ EYA_{a1} \\ EZA_{a1} \end{bmatrix}$ $\begin{bmatrix} EAA_{a1} \\ EBA_{a1} \\ ECA_{a1} \end{bmatrix}$ | ... | $\begin{bmatrix} EXA_0 \\ EYA_0 \\ EZA_0 \end{bmatrix}$ $\begin{bmatrix} EAA_0 \\ EBA_0 \\ ECA_0 \end{bmatrix}$ | ... | $\begin{bmatrix} EXA_{am} \\ EYA_{am} \\ EZA_{am} \end{bmatrix}$ $\begin{bmatrix} EAA_{am} \\ EBA_{am} \\ ECA_{am} \end{bmatrix}$ |
| ⋮ | ⋮ | | ⋮ | | ⋮ |
| C-AXIS 0 DEGREES | $\begin{bmatrix} EXA_{a1} \\ EYA_{a1} \\ EZA_{a1} \end{bmatrix}$ $\begin{bmatrix} EAA_{a1} \\ EBA_{a1} \\ ECA_{a1} \end{bmatrix}$ | ... | $\begin{bmatrix} EXA_0 \\ EYA_0 \\ EZA_0 \end{bmatrix}$ $\begin{bmatrix} EAA_0 \\ EBA_0 \\ ECA_0 \end{bmatrix}$ | ... | $\begin{bmatrix} EXA_{am} \\ EYA_{am} \\ EZA_{am} \end{bmatrix}$ $\begin{bmatrix} EAA_{am} \\ EBA_{am} \\ ECA_{am} \end{bmatrix}$ |
| ⋮ | ⋮ | | ⋮ | | ⋮ |
| cn DEGREES | $\begin{bmatrix} EXA_{a1} \\ EYA_{a1} \\ EZA_{a1} \end{bmatrix}$ $\begin{bmatrix} EAA_{a1} \\ EBA_{a1} \\ ECA_{a1} \end{bmatrix}$ | ... | $\begin{bmatrix} EXA_0 \\ EYA_0 \\ EZA_0 \end{bmatrix}$ $\begin{bmatrix} EAA_0 \\ EBA_0 \\ ECA_0 \end{bmatrix}$ | ... | $\begin{bmatrix} EXA_{am} \\ EYA_{am} \\ EZA_{am} \end{bmatrix}$ $\begin{bmatrix} EAA_{am} \\ EBA_{am} \\ ECA_{am} \end{bmatrix}$ |

FIG. 4A

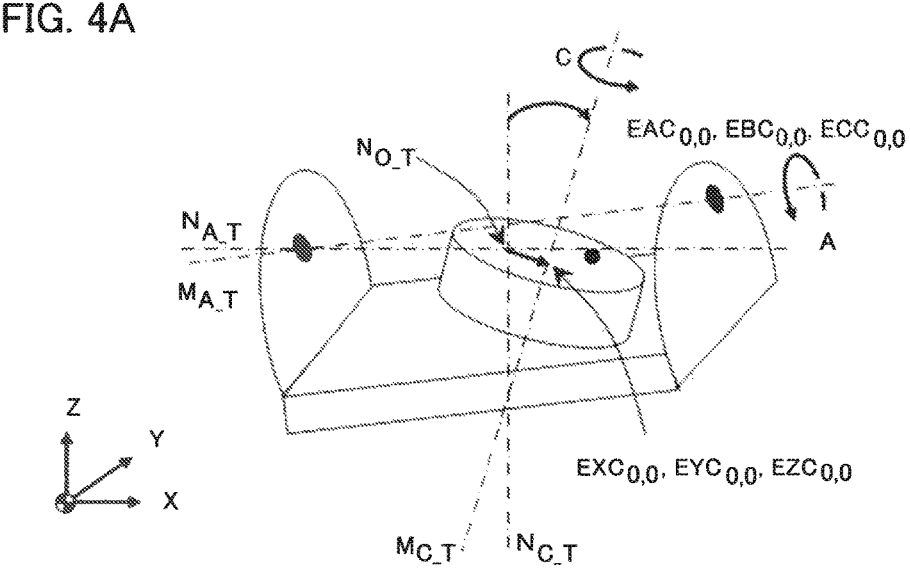

WHEN A EQUALS 0 DEGREES AND C = 0 DEGREES

WHEN A = 0 DEGREES AND C = 45 DEGREES

WHEN A = 0 DEGREES AND C = 90 DEGREES

WHEN A = 45 DEGREES AND C = 0 DEGREES

WHEN A = 90 DEGREES AND C = 0 DEGREES

DEFINITION OF A-AXIS COORDINATE SYSTEM

MOTION OF A-AXIS COORDINATE SYSTEM

FIG. 9

|  | A-AXIS | | | | |
|---|---|---|---|---|---|
|  | a1 DEGREES | ... | 0 DEGREES | ... | am DEGREES |
| c1 DEGREES | $\begin{bmatrix} EXC_{0,c1} - EXA_0 \\ EYC_{0,c1} - EYA_0 \\ EZC_{0,c1} - EZA_0 \end{bmatrix}$ $\begin{bmatrix} EAC_{0,c1} - EAA_0 \\ EBC_{0,c1} - EBA_0 \\ ECC_{0,c1} - ECA_0 \end{bmatrix}$ | ... | $\begin{bmatrix} EXC_{0,c1} - EXA_0 \\ EYC_{0,c1} - EYA_0 \\ EZC_{0,c1} - EZA_0 \end{bmatrix}$ $\begin{bmatrix} EAC_{0,c1} - EAA_0 \\ EBC_{0,c1} - EBA_0 \\ ECC_{0,c1} - ECA_0 \end{bmatrix}$ | ... | $\begin{bmatrix} EXC_{0,c1} - EXA_0 \\ EYC_{0,c1} - EYA_0 \\ EZC_{0,c1} - EZA_0 \end{bmatrix}$ $\begin{bmatrix} EAC_{0,c1} - EAA_0 \\ EBC_{0,c1} - EBA_0 \\ ECC_{0,c1} - ECA_0 \end{bmatrix}$ |
| ⋮ | ⋮ | ⋮ | ⋮ | ⋮ | ⋮ |
| C-AXIS 0 DEGREES | $\begin{bmatrix} EXC_{0,c2} - EXA_0 \\ EYC_{0,c2} - EYA_0 \\ EZC_{0,c2} - EZA_0 \end{bmatrix}$ $\begin{bmatrix} EAC_{0,c2} - EAA_0 \\ EBC_{0,c2} - EBA_0 \\ ECC_{0,c2} - ECA_0 \end{bmatrix}$ | ... | $\begin{bmatrix} EXC_{0,c2} - EXA_0 \\ EYC_{0,c2} - EYA_0 \\ EZC_{0,c2} - EZA_0 \end{bmatrix}$ $\begin{bmatrix} EAC_{0,c2} - EAA_0 \\ EBC_{0,c2} - EBA_0 \\ ECC_{0,c2} - ECA_0 \end{bmatrix}$ | ... | $\begin{bmatrix} EXC_{0,c2} - EXA_0 \\ EYC_{0,c2} - EYA_0 \\ EZC_{0,c2} - EZA_0 \end{bmatrix}$ $\begin{bmatrix} EAC_{0,c2} - EAA_0 \\ EBC_{0,c2} - EBA_0 \\ ECC_{0,c2} - ECA_0 \end{bmatrix}$ |
| ⋮ | ⋮ | ⋮ | ⋮ | ⋮ | ⋮ |
| cn DEGREES | $\begin{bmatrix} EXC_{0,cn} - EXA_0 \\ EYC_{0,cn} - EYA_0 \\ EZC_{0,cn} - EZA_0 \end{bmatrix}$ $\begin{bmatrix} EAC_{0,cn} - EAA_0 \\ EBC_{0,cn} - EBA_0 \\ ECC_{0,cn} - ECA_0 \end{bmatrix}$ | ... | $\begin{bmatrix} EXC_{0,cn} - EXA_0 \\ EYC_{0,cn} - EYA_0 \\ EZC_{0,cn} - EZA_0 \end{bmatrix}$ $\begin{bmatrix} EAC_{0,cn} - EAA_0 \\ EBC_{0,cn} - EBA_0 \\ ECC_{0,cn} - ECA_0 \end{bmatrix}$ | ... | $\begin{bmatrix} EXC_{0,cn} - EXA_0 \\ EYC_{0,cn} - EYA_0 \\ EZC_{0,cn} - EZA_0 \end{bmatrix}$ $\begin{bmatrix} EAC_{0,cn} - EAA_0 \\ EBC_{0,cn} - EBA_0 \\ ECC_{0,cn} - ECA_0 \end{bmatrix}$ |

FIG. 10

|  | | A-AXIS | | |
|---|---|---|---|---|
|  | | A1 DEGREES | 0 DEGREES | am DEGREES |
| C-AXIS | c1 DEGREES | $\begin{bmatrix} EXA_{a1} \\ EYA_{a1} \\ EZA_{a1} \end{bmatrix}$ $\begin{bmatrix} EAA_{a1} \\ EBA_{a1} \\ ECA_{a1} \end{bmatrix}$ $\begin{bmatrix} EXC_{0,c1} - EXA_0 \\ EYC_{0,c1} - EYA_0 \\ EZC_{0,c1} - EZA_0 \end{bmatrix}$ $\begin{bmatrix} EAC_{0,c1} - EAA_0 \\ EBC_{0,c1} - EBA_0 \\ ECC_{0,c1} - ECA_0 \end{bmatrix}$ | $\begin{bmatrix} EXA_0 \\ EYA_0 \\ EZA_0 \end{bmatrix}$ $\begin{bmatrix} EAA_0 \\ EBA_0 \\ ECA_0 \end{bmatrix}$ $\begin{bmatrix} EXC_{0,c1} - EXA_0 \\ EYC_{0,c1} - EYA_0 \\ EZC_{0,c1} - EZA_0 \end{bmatrix}$ $\begin{bmatrix} EAC_{0,c1} - EAA_0 \\ EBC_{0,c1} - EBA_0 \\ ECC_{0,c1} - ECA_0 \end{bmatrix}$ | $\begin{bmatrix} EXA_{am} \\ EYA_{am} \\ EZA_{am} \end{bmatrix}$ $\begin{bmatrix} EAA_{am} \\ EBA_{am} \\ ECA_{am} \end{bmatrix}$ $\begin{bmatrix} EXC_{0,c1} - EXA_0 \\ EYC_{0,c1} - EYA_0 \\ EZC_{0,c1} - EZA_0 \end{bmatrix}$ $\begin{bmatrix} EAC_{0,c1} - EAA_0 \\ EBC_{0,c1} - EBA_0 \\ ECC_{0,c1} - ECA_0 \end{bmatrix}$ |
| | 0 DEGREES | $\begin{bmatrix} EXA_{a1} \\ EYA_{a1} \\ EZA_{a1} \end{bmatrix}$ $\begin{bmatrix} EAA_{a1} \\ EBA_{a1} \\ ECA_{a1} \end{bmatrix}$ $\begin{bmatrix} EXC_{0,0} - EXA_0 \\ EYC_{0,0} - EYA_0 \\ EZC_{0,0} - EZA_0 \end{bmatrix}$ $\begin{bmatrix} EAC_{0,0} - EAA_0 \\ EBC_{0,0} - EBA_0 \\ ECC_{0,0} - ECA_0 \end{bmatrix}$ | $\begin{bmatrix} EXA_0 \\ EYA_0 \\ EZA_0 \end{bmatrix}$ $\begin{bmatrix} EAA_0 \\ EBA_0 \\ ECA_0 \end{bmatrix}$ $\begin{bmatrix} EXC_{0,0} - EXA_0 \\ EYC_{0,0} - EYA_0 \\ EZC_{0,0} - EZA_0 \end{bmatrix}$ $\begin{bmatrix} EAC_{0,0} - EAA_0 \\ EBC_{0,0} - EBA_0 \\ ECC_{0,0} - ECA_0 \end{bmatrix}$ | $\begin{bmatrix} EXA_{am} \\ EYA_{am} \\ EZA_{am} \end{bmatrix}$ $\begin{bmatrix} EAA_{am} \\ EBA_{am} \\ ECA_{am} \end{bmatrix}$ $\begin{bmatrix} EXC_{0,0} - EXA_0 \\ EYC_{0,0} - EYA_0 \\ EZC_{0,0} - EZA_0 \end{bmatrix}$ $\begin{bmatrix} EAC_{0,0} - EAA_0 \\ EBC_{0,0} - EBA_0 \\ ECC_{0,0} - ECA_0 \end{bmatrix}$ |
| | cn DEGREES | $\begin{bmatrix} EXA_{a1} \\ EYA_{a1} \\ EZA_{a1} \end{bmatrix}$ $\begin{bmatrix} EAA_{a1} \\ EBA_{a1} \\ ECA_{a1} \end{bmatrix}$ $\begin{bmatrix} EXC_{0,cn} - EXA_0 \\ EYC_{0,cn} - EYA_0 \\ EZC_{0,cn} - EZA_0 \end{bmatrix}$ $\begin{bmatrix} EAC_{0,cn} - EAA_0 \\ EBC_{0,cn} - EBA_0 \\ ECC_{0,cn} - ECA_0 \end{bmatrix}$ | $\begin{bmatrix} EXA_0 \\ EYA_0 \\ EZA_0 \end{bmatrix}$ $\begin{bmatrix} EAA_0 \\ EBA_0 \\ ECA_0 \end{bmatrix}$ $\begin{bmatrix} EXC_{0,cn} - EXA_0 \\ EYC_{0,cn} - EYA_0 \\ EZC_{0,cn} - EZA_0 \end{bmatrix}$ $\begin{bmatrix} EAC_{0,cn} - EAA_0 \\ EBC_{0,cn} - EBA_0 \\ ECC_{0,cn} - ECA_0 \end{bmatrix}$ | $\begin{bmatrix} EXA_{am} \\ EYA_{am} \\ EZA_{am} \end{bmatrix}$ $\begin{bmatrix} EAA_{am} \\ EBA_{am} \\ ECA_{am} \end{bmatrix}$ $\begin{bmatrix} EXC_{0,cn} - EXA_0 \\ EYC_{0,cn} - EYA_0 \\ EZC_{0,cn} - EZA_0 \end{bmatrix}$ $\begin{bmatrix} EAC_{0,cn} - EAA_0 \\ EBC_{0,cn} - EBA_0 \\ ECC_{0,cn} - ECA_0 \end{bmatrix}$ |

|  | | A-AXIS | | | |
|---|---|---|---|---|---|
|  | a1 DEGREES | ... | 0 DEGREES | ... | am DEGREES |
| c1 DEGREES | | | [EXC$_{0,c1}$, EYC$_{0,c1}$, EZC$_{0,c1}$] [EAC$_{0,c1}$, EBC$_{0,c1}$, ECC$_{0,c1}$] | | |
| ⋮ | | | ⋮ | | |
| C-AXIS 0 DEGREES | [EXA$_{a1}$, EYA$_{a1}$, EZA$_{a1}$] [EAA$_{a1}$, EBA$_{a1}$, ECA$_{a1}$] | ... [EXA$_0$, EYA$_0$, EZA$_0$] [EAA$_0$, EBA$_0$, ECA$_0$] | | ... | [EXA$_{am}$, EYA$_{am}$, EZA$_{am}$] [EAA$_{am}$, EBA$_{am}$, ECA$_{am}$] |
|  | | | [EXC$_{0,0}$, EYC$_{0,0}$, EZC$_{0,0}$] [EAC$_{0,0}$, EBC$_{0,0}$, ECC$_{0,0}$] | | |
| ⋮ | | | ⋮ | | |
| cn DEGREES | | | [EXC$_{0,cn}$, EYC$_{0,cn}$, EZC$_{0,cn}$] [EAC$_{0,cn}$, EBC$_{0,cn}$, ECC$_{0,cn}$] | | |

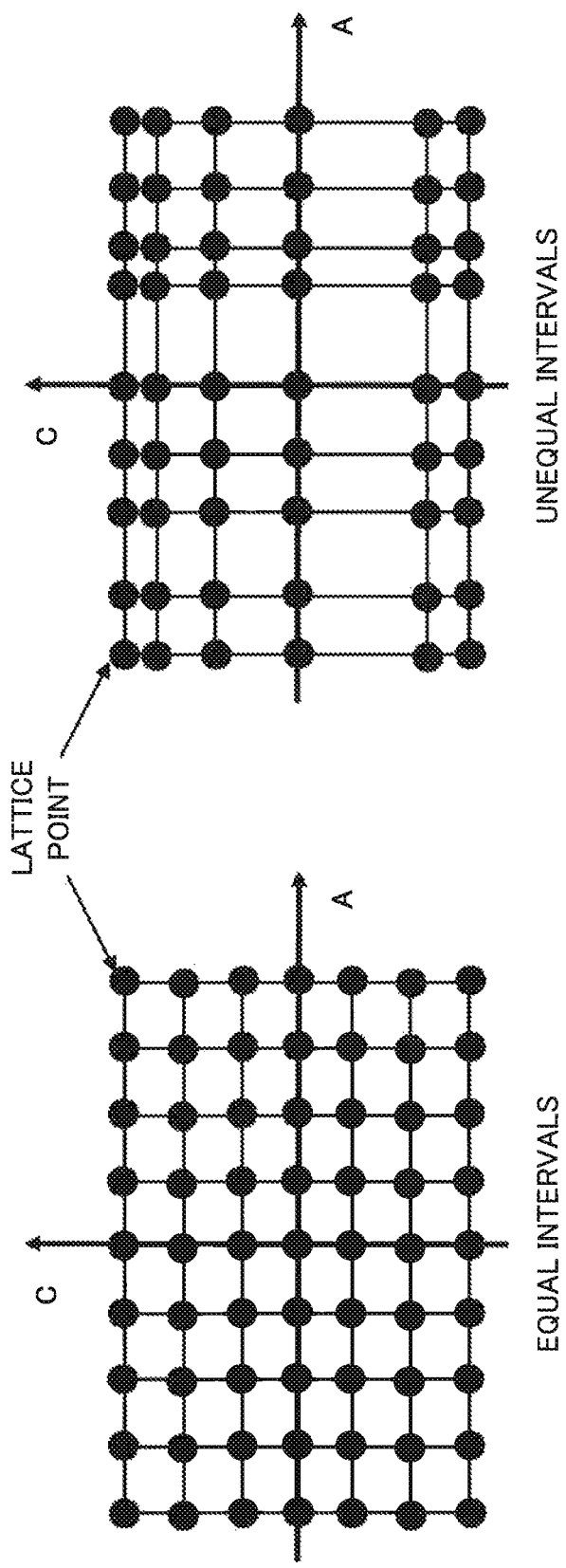

FIG. 14B

| | | A-AXIS | | | | |
|---|---|---|---|---|---|---|
| | | a1 DEGREES | ... | 0 DEGREES | ... | am DEGREES |
| C-AXIS | c1 DEGREES | $[\Delta X_{a1,c1}, \Delta Y_{a1,c1}, \Delta Z_{a1,c1}]$ $[\Delta I_{a1,c1}, \Delta J_{a1,c1}, \Delta K_{a1,c1}]$ | ... | $[\Delta X_{0,c1}, \Delta Y_{0,c1}, \Delta Z_{0,c1}]$ $[\Delta I_{0,c1}, \Delta J_{0,c1}, \Delta K_{0,c1}]$ | ... | $[\Delta X_{am,c1}, \Delta Y_{am,c1}, \Delta Z_{am,c1}]$ $[\Delta I_{am,c1}, \Delta J_{am,c1}, \Delta K_{am,c1}]$ |
| | ⋮ | ⋮ | ⋮ | ⋮ | ⋮ | ⋮ |
| | 0 DEGREES | $[\Delta X_{a1,0}, \Delta Y_{a1,0}, \Delta Z_{a1,0}]$ $[\Delta I_{a1,0}, \Delta J_{a1,0}, \Delta K_{a1,0}]$ | ... | $[\Delta X_{0,0}, \Delta Y_{0,0}, \Delta Z_{0,0}]$ $[\Delta I_{0,0}, \Delta J_{0,0}, \Delta K_{0,0}]$ | ... | $[\Delta X_{am,0}, \Delta Y_{am,0}, \Delta Z_{am,0}]$ $[\Delta I_{am,0}, \Delta J_{am,0}, \Delta K_{am,0}]$ |
| | ⋮ | ⋮ | ⋮ | ⋮ | ⋮ | ⋮ |
| | cn DEGREES | $[\Delta X_{a1,cn}, \Delta Y_{a1,cn}, \Delta Z_{a1,cn}]$ $[\Delta I_{a1,cn}, \Delta J_{a1,cn}, \Delta K_{a1,cn}]$ | ... | $[\Delta X_{0,cn}, \Delta Y_{0,cn}, \Delta Z_{0,cn}]$ $[\Delta I_{0,cn}, \Delta J_{0,cn}, \Delta K_{0,cn}]$ | ... | $[\Delta X_{am,cn}, \Delta Y_{am,cn}, \Delta Z_{am,cn}]$ $[\Delta I_{am,cn}, \Delta J_{am,cn}, \Delta K_{am,cn}]$ |

WHEN C = 0 AND A = a

WHEN C = c AND A = a

FIG. 23B

| | C-AXIS | | | | |
|---|---|---|---|---|---|
| | c1 DEGREES | ... | 0 DEGREES | ... | cm DEGREES |
| A-AXIS c1 DEGREES | | | $[EXA_{0,c1}, EYA_{0,c1}, EZA_{0,c1}]$ $[EAA_{0,c1}, EBA_{0,c1}, ECA_{0,c1}]$ | | |
| ⋮ | | | ⋮ | | |
| 0 DEGREES | $[EXC_{c1}, EYC_{c1}, EZC_{c1}]$ $[EAC_{c1}, EBC_{c1}, ECC_{c1}]$ | ... | $[EXC_0, EYC_0, EZC_0]$ $[EAC_0, EBC_0, ECC_0]$ | ... | $[EXC_{cm}, EYC_{cm}, EZC_{cm}]$ $[EAC_{cm}, EBC_{cm}, ECC_{cm}]$ |
| | | | $[EXA_{0,0}, EYA_{0,0}, EZA_{0,0}]$ $[EAA_{0,0}, EBA_{0,0}, ECA_{0,0}]$ | | |
| ⋮ | | | ⋮ | | |
| an DEGREES | | | $[EXA_{0,an}, EYA_{0,an}, EZA_{0,an}]$ $[EAA_{0,an}, EBA_{0,an}, ECA_{0,an}]$ | | |

ERROR CORRECTION AMOUNT CREATING DEVICE

RELATED APPLICATIONS

The present application claims priority to Japanese Application Number 2013-202358, filed Sep. 27, 2013, the disclosure of which is hereby incorporated by reference herein in its entirety.

BACKGROUND OF THE INVENTION

1. Field of the Invention

The present invention relates to an error correction amount creating device for a five-axis machine having three linear axes and two rotation axes, in which at least one of a rotation axis-dependent translation correction amount and a rotation axis-dependent rotation correction amount with respect to the two rotation axes is obtained from measurement data of measurement by a measuring machine to create an error correction amount.

2. Description of the Related Art

In a five-axis machine having three linear axes and two rotation axes, an error dependent on the rotation axis (i.e., an error in accordance with the rotation amount of the rotation axis) occurs when the rotation axis is moved according to a movement instruction. Therefore, in the case of performing machining with high precision, it is necessary to correct the error dependent on the rotation axis with an error correction amount dependent on the rotation axis.

In Japanese Patent Application Laid-open No. 2009-151756 and Journal of Technical Disclosure No. 2009-505137, it is disclosed that an error dependent on a rotation axis is corrected by obtaining the translation error amount and rotation error amount dependent on the rotation axis from measurement data obtained by measurement using a measuring machine and creating an error correction table.

Japanese Patent Application Laid-open No. 2009-151756 mentioned above discloses a technique for a five-axis machine in which a two-dimensional coordinate system space is divided at equal intervals or unequal intervals in each axis direction to obtain, from measurement data for each position of division, the translation error amount and rotation error amount dependent on the rotation axis for each lattice point of lattice regions into which the two-dimensional coordinate system space with the two rotation axes is divided at equal intervals or unequal intervals in each direction.

On the assumption that the error of the center of rotation of the rotation axis does not change along with rotation, Journal of Technical Disclosure No. 2009-505137 discloses a technique for a five-axis machine in which a two-dimensional coordinate system space with two rotation axes is divided into lattice regions of equal intervals or unequal intervals in each axis direction to obtain the translation error amount and rotation error amount dependent on the rotation axis for each lattice point from measurement data of position at which all angles of these two rotation axes are zero.

However, with the technique disclosed in Japanese Patent Application Laid-open No. 2009-151756 mentioned above, measurement of the error for each position of division takes time. With the technique disclosed in Journal of Technical Disclosure No. 2009-505137 mentioned above, a case where the error of the center of rotation of the rotation axis changes along with rotation cannot be dealt with.

SUMMARY OF THE INVENTION

Thus, an object of the present invention is to provide an error correction amount creating device that can deal with a case where the error of the center of rotation of a rotation axis changes along with rotation and that enables simplification of the measurement of error and an increase in speed of the calculation of the error correction amount by obtaining at least one of the translation error correction amount dependent on the rotation axis and rotation error correction amount dependent on the rotation axis from a small amount of measurement data.

An error correction amount creating device of the present invention creates an error correction amount for a five-axis machine controlled by a numerical controller and having three linear axes and two rotation axes. The error correction amount creating device includes a measurement data input unit that inputs, as arithmetic measurement data, a translation error and rotation error at respective positions divided at equal or unequal intervals for each of the two rotation axes, measured by a measuring machine, an error correction amount arithmetic unit that obtains, from the arithmetic measurement data, at least one of a rotation axis-dependent translation error correction amount that is a translation error correction amount and a rotation axis-dependent rotation error correction amount that is a rotation error correction amount, for each lattice point of lattice regions into which a two-dimensional coordinate system space with the two rotation axes is divided at the equal intervals or unequal intervals in each axis direction, and an error correction amount output unit that outputs at least one of the rotation axis-dependent translation error correction amount and the rotation axis-dependent rotation error correction amount to the numerical controller controlling the five-axis machine.

The error correction amount creating device may be independent from the numerical controller or be present within the numerical controller.

The five-axis machine may be a table rotating five-axis machine in which a table is rotated about the two rotation axes or a head rotating five-axis machine in which a head is rotated about the two rotation axes.

The present invention can provide an error correction amount creating device that can deal with a case where the error of the center of rotation of a rotation axis changes along with rotation and that enables simplification of the measurement of error and an increase in speed of the calculation of the error correction amount by obtaining at least one of the translation error correction amount dependent on the rotation axis and the rotation error correction amount dependent on the rotation axis from a small amount of measurement data.

BRIEF DESCRIPTION OF THE DRAWINGS

The above-mentioned as well as other objects and features of the present invention will become clear from the description of embodiments below with reference to the accompanying drawings. Of the drawings:

FIG. 3A is a view showing each position at which a two-dimensional coordinate system space with two rotation axes is divided at equal intervals or unequal intervals in each axis direction;

FIG. 3B is a view illustrating the translation error and rotation error of the A-axis for each position of division as shown in FIG. 3A;

FIGS. 4A to 4E are views illustrating the translation error and rotation error of the C-axis;

FIG. 9 is a view illustrating the translation error and rotation error dependent on the C-axis when seen from the A-axis coordinate system for each position of division as shown in FIG. 3A;

FIG. 10 is a view illustrating that the translation errors and rotation errors dependent on the A-axis are the same within a column (frame in broken line), since the translation error and rotation error dependent on the A-axis do not change depending on the C-axis position but change depending on only the A-axis position a;

FIG. 14A is a view illustrating an error correction table of the translation error correction amount and the rotation error correction amount;

FIG. 14B is a view illustrating the translation error correction amount and rotation error correction amount for each lattice point shown in FIG. 14A;

FIG. 23B is a view illustrating a case where the translation error and rotation error dependent on the C-axis and the translation error and rotation error dependent on the A-axis when seen from the C-axis coordinate system for each position of division are respectively combined;

DESCRIPTION OF THE PREFERRED EMBODIMENTS

First Embodiment

<1> on Intended Machine and Error

Figure 1:
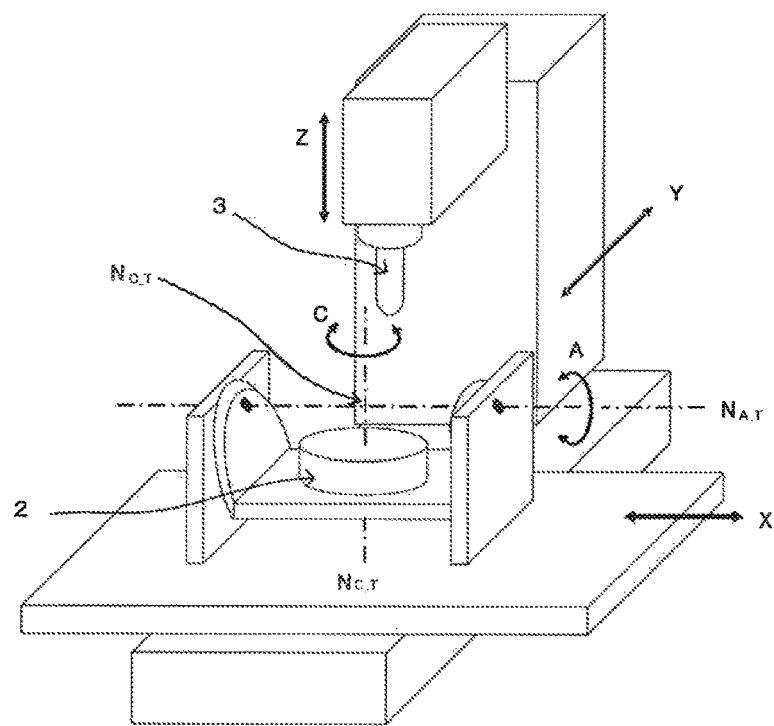
FIG. 1 is a view illustrating a table rotating five-axis machine having two rotation axes without an error.

FIG. 1 shows a table rotating five-axis machine having two rotation axes without an error. A table 2 rotates about the A-axis and the C-axis and moves along the X-axis. A tool head mounted with a tool 3 moves along the Y-axis and the Z-axis. The machine may be of other configurations as long as the table 2 rotates about two rotation axes.

When the two rotation axes are without an error and A equals 0 degrees, the table 2 is horizontal as in FIG. 1. A nominal A-axis rotation center line $N_{A\_T}$ and a nominal C-axis rotation center line $N_{C\_T}$ with an intersection $N_{O\_T}$ are orthogonal. Herein, "N" means nominal, and "M" which appears later in $M_{A\_T}$ (misaligned A-axis rotation center line) or the like means misalignment. Also, "$\_T$" indicates that data forms an error of the table. The position instruction with respect to the A-axis and C-axis that are rotation axes is assumed as (a, c).

When the C-axis is actually moved according to the movement instruction, an error occurs. In "JIS B6190-7, FIG. 1, b) error motion of rotation axis," the error of the C-axis is represented by "EXC: radial direction motion in the X-direction," "EYC: radial direction motion in the Y-direction," "EZC: axis direction motion," "EAC: tilt motion about the X-axis," "EBC: tilt motion about the Y-axis," and "ECC: angle positioning error." In the present invention, "EXC: radial direction motion in the X-direction," "EYC: radial direction motion in the Y-direction," and "EZC: axis direction motion" are called translation error, and "EAC: tilt motion about the X-axis," "EBC: tilt motion about the Y-axis," and "ECC: angle positioning error" are called rotation error.

For the A-axis, in a similar manner, there are "EXA: radial direction motion in the X-direction," "EYA: radial direction motion in the Y-direction," and "EZA: axis direction motion" as the translation error of the A-axis and "EAA: tilt motion about the X-axis," "EBA: tilt motion about the Y-axis," and "ECA: angle positioning error" as the rotation error of the A-axis.

<2> on Translation Error and Rotation Error of A-Axis

Figure 2A:
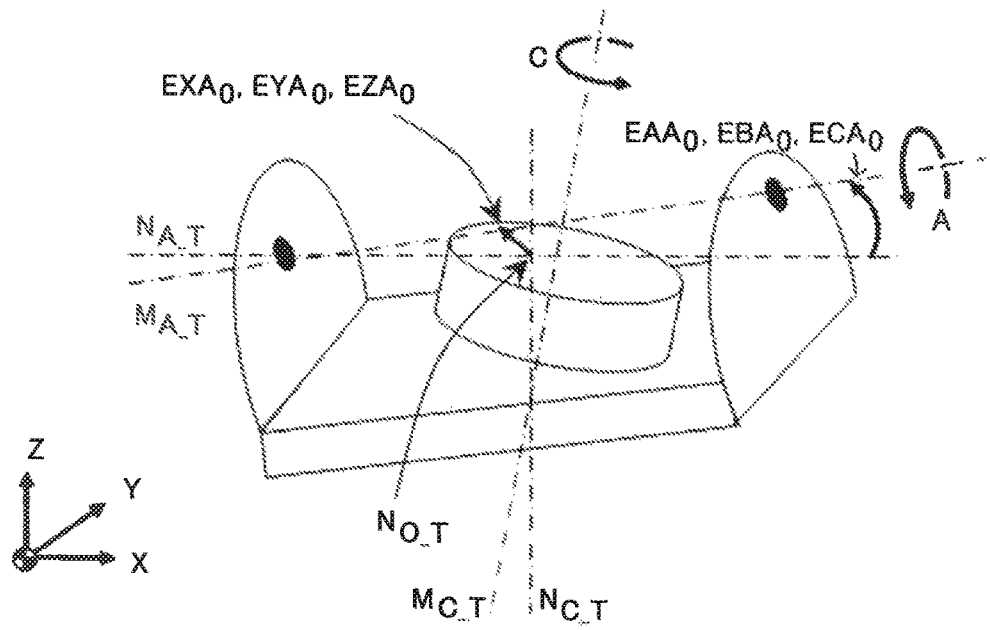
FIGS. 2A to 2C are views illustrating the translation errors and rotation errors of the A-axis when the C-axis is fixed in an arbitrary position and the A-axis is at each of 0 degrees, 45 degrees, and 90 degrees.
Figure 2B:
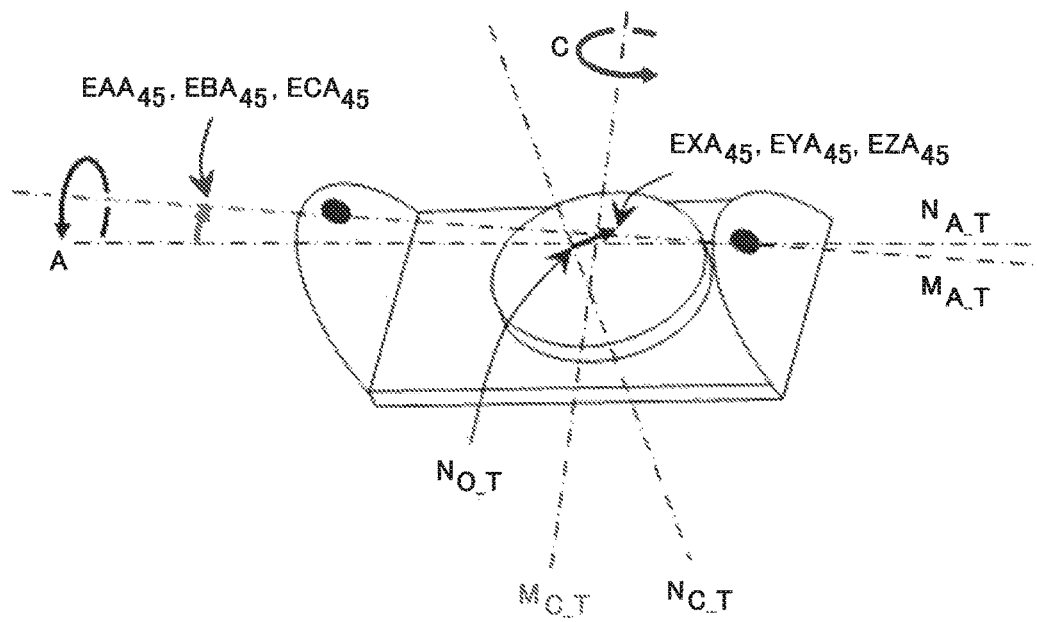
Figure 2C:
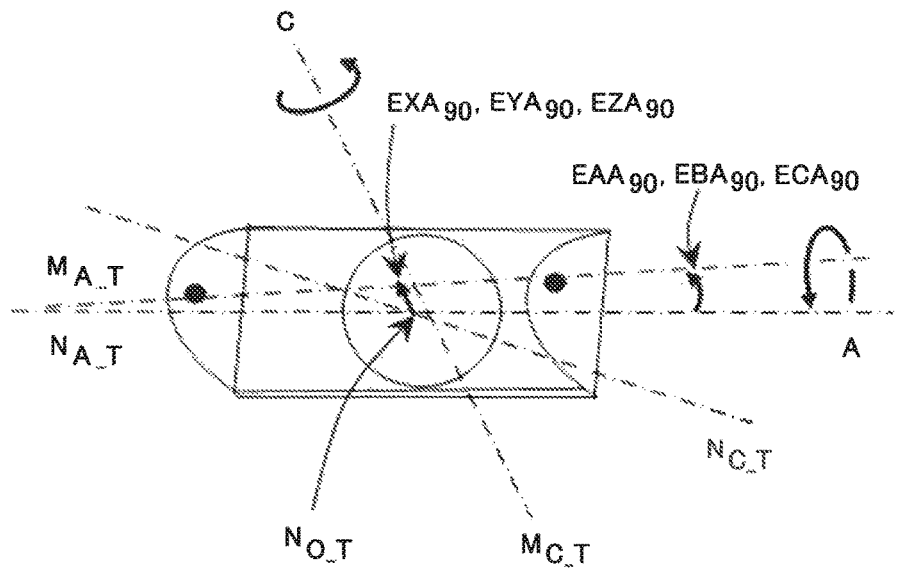

FIGS. 2A, 2B, and 2C are views showing the translation errors and rotation errors of the A-axis when the C-axis is fixed in an arbitrary position and the A-axis is at each of 0 degrees, 45 degrees, and 90 degrees. Although the actual errors are small, the errors are depicted with an exaggeration in FIGS. 2A to 2C.

The translation error and rotation error of the A-axis are defined with a machine coordinate system XYZ. The translation error of the A-axis is the respective X, Y, and Z components of the distance to $M_{A\_T}$ from $N_{A\_T}$ passing through $N_{O\_T}$ that is the intersection of the nominal A-axis rotation center line and the nominal C-axis rotation center line. The rotation error of the A-axis is the tilt about the X-axis, the Y-axis, and the Z-axis of $M_{A\_T}$ with respect to $N_{A\_T}$.

As shown in FIGS. 2A, 2B, and 2C, $M_{A\_T}$ may change depending on only an A-axis position a when the C-axis is fixed at an arbitrary angle and a change is made for the A-axis to each of 0 degrees, 45 degrees, and 90 degrees. Therefore, the translation error and rotation error of the A-axis change depending on the A-axis position a. In the present invention, the translation error and rotation error of the A-axis that change depending on the A-axis position a are as follows.

When A=a, the X component, the Y component, and the Z component of the distance to $M_{A\_T}$ from $N_{A\_T}$ are respectively assumed as EXA(a), EYA(a), and EZA(a).

When A=a, the tilt about the X-axis, the tilt about the Y-axis, and the tilt about the Z-axis of $M_{A\_T}$ with respect to $N_{A\_T}$ are respectively assumed as EAA(a), EBA(a), and ECA(a).

Hereinafter, for the sake of simplification, "EXA(a)," "EYA(a)," "EZA(a)," "EAA(a)," "EBA(a)," and "ECA(a)" that are the translation error and rotation error of the A-axis are represented as "$EXA_a$," "$EYA_a$," "$EZA_a$," "$EAA_a$," "$EBA_a$," and "$ECA_a$."

FIG. 3A shows each position at which a two-dimensional coordinate system space with two rotation axes is divided at equal intervals or unequal intervals in each axis direction. The interval in the case of division at equal intervals may be an error interval set as an error interval parameter or may be an error interval instructed by a program. As an interval that changes in correspondence with the A-axis or C-axis position, the interval in the case of division at unequal intervals may be an error interval set as a plurality of error interval parameters or may be an error interval instructed by a program.

The translation error and rotation error of the A-axis for each position of division are as in FIG. 3B. A column (frame in broken line) in FIG. 3B shows the translation errors and rotation errors dependent on the A-axis for respective positions where the A-axis positions are the same. Since the translation error and rotation error of the A-axis change depending on only the A-axis position a (a1, . . . , 0, . . . , am), the translation errors and rotation errors dependent on the A-axis are the same within a column in FIG. 3B (are not dependent on the C-axis position).

<3> on Translation Error and Rotation Error of C-Axis

FIGS. 4A, 4B, 4C, 4D, and 4E respectively show the translation errors and rotation errors of the C-axis when A equals 0 degrees and C equals 0 degrees, A equals 0 degrees and C equals 45 degrees, A equals 0 degrees and C equals 90 degrees, A equals 45 degrees and C equals 0 degrees, and A equals 90 degrees and C equals 0 degrees. Although the actual errors are small, the errors are depicted with an exaggeration in FIGS. 4A to 4E.

The translation error and rotation error of the C-axis are defined with the machine coordinate system XYZ. The translation error of the C-axis is the respective X, Y, and Z components of the distance to $M_{c\_T}$ from $N_{c\_T}$ passing through $N_{O\_T}$ that is the intersection of the nominal A-axis rotation center line and the nominal C-axis rotation center line. The rotation error of the C-axis is the tilt about the X-axis, the Y-axis, and the Z-axis of $M_{c\_T}$ with respect to $N_{c\_T}$.

Figure 4B:
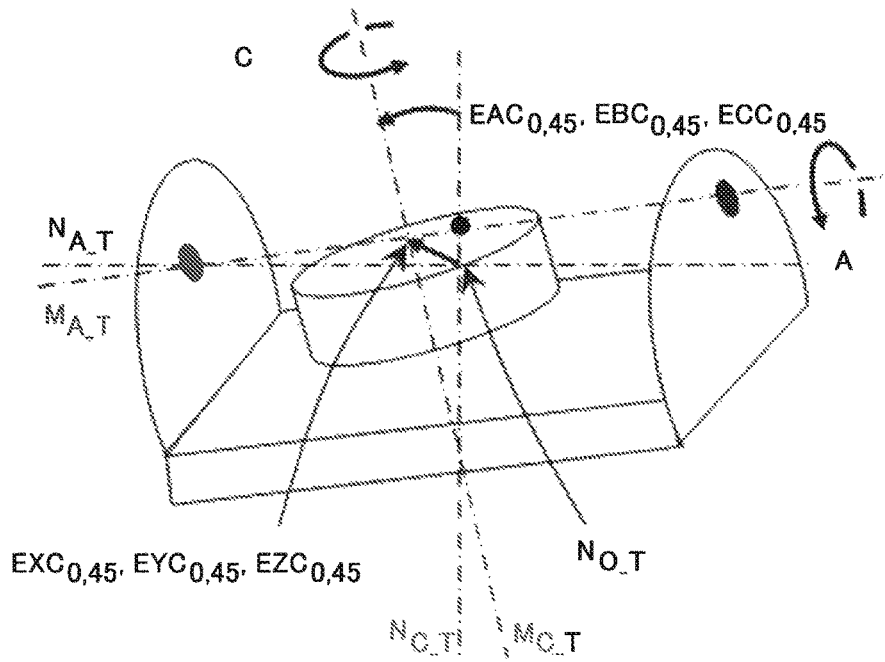
Figure 4C:
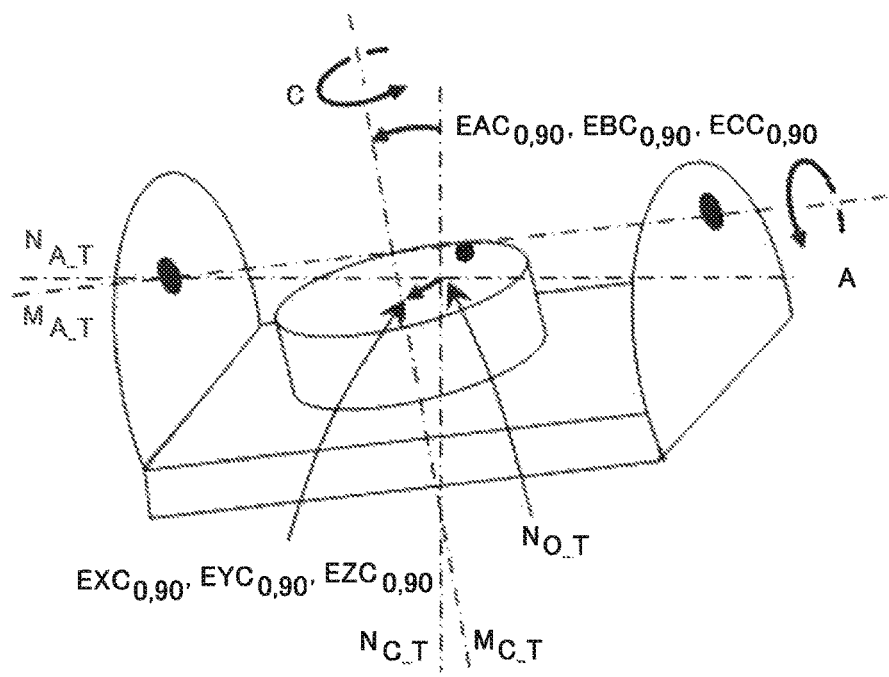
Figure 4D:
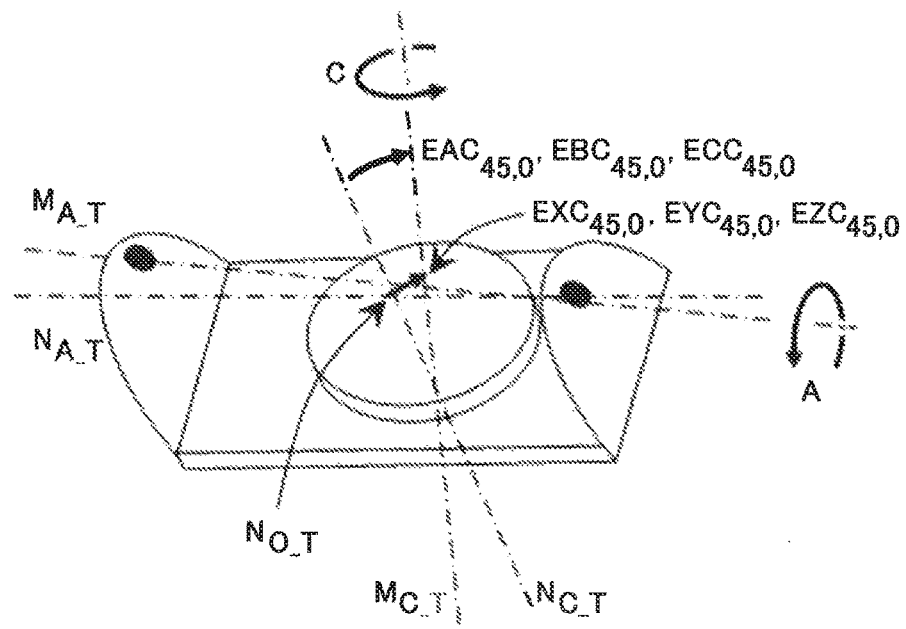
Figure 4E:
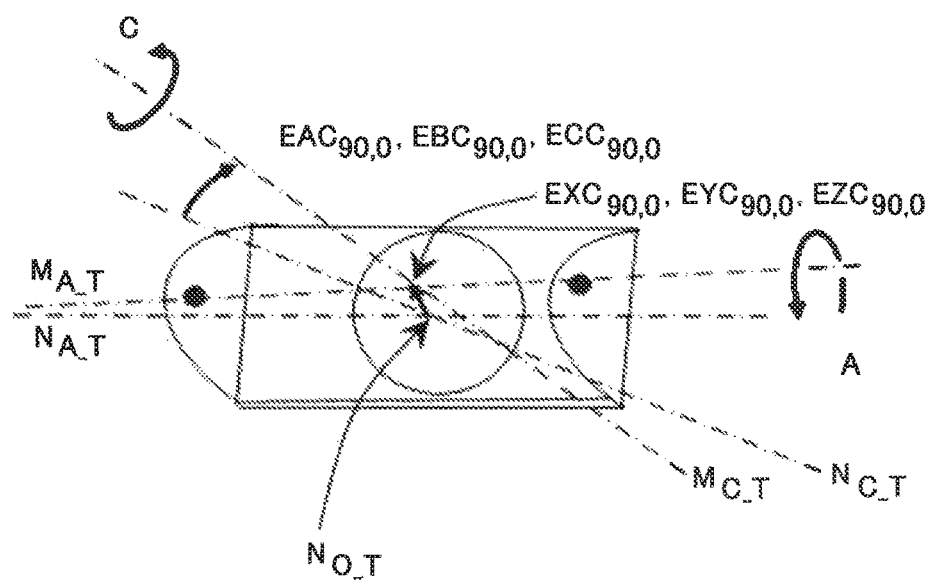

As shown in FIGS. 4A to 4C, $M_{c\_T}$ may change depending on the C-axis position c when the A-axis is fixed at 0 degrees and a change is made for the C-axis to each of 0 degrees, 45 degrees, and 90 degrees. Therefore, the translation error and rotation error of the C-axis change depending on the C-axis position c. Further, as shown in FIGS. 4D and 4E, $M_{c\_T}$ may change depending on the A-axis position a when the C-axis position is fixed at 0 degrees and the A-axis position is changed to each of 45 degrees and 90 degrees. Therefore, the translation error and rotation error of the C-axis also change depending on the A-axis position a.

In this manner, the translation error and rotation error of the C-axis change depending on the A-axis position a and the C-axis position c. Therefore, regarding the translation error and rotation error of the C-axis that change depending on the A-axis position a and the C-axis position c in the present invention, the X component, the Y component, and the Z component of the distance to $M_{c\_T}$ from $N_{c\_T}$ when A=a and C=c are respectively assumed as EXC(a, c), EYC(a, c), and EZC(a, c), and the tilt about the X-axis, the tilt about the Y-axis, and the tilt about the Z-axis of $M_{c\_T}$ with respect to $N_{c\_T}$ when A=a and C=c are respectively assumed as EAC(a, c), EBC(a, c), and ECC(a, c).

Hereinafter, for the sake of simplification, "EXC(a, c)," "EYC(a, c)," "EZC(a, c)," "EAC(a, c)," "EBC(a, c)," and "ECC(a, c)" that are the translation error and rotation error of the C-axis are represented as "$EXC_{a,c}$," "$EYC_{a,c}$," "$EZC_{a,c}$," "$EAC_{a,c}$," "$EBC_{a,c}$," and "$ECC_{a,c}$."

As described above, the translation errors and rotation errors of the A-axis and C-axis change depending on the A-axis position a and C-axis position c. Therefore, in the present invention, the translation error and rotation error that change depending on the rotation axis position (angle) are referred to as translation error and rotation error dependent on the rotation axis, and a correction amount for correction of the error is referred to as translation error correction amount and rotation error correction amount dependent on the rotation axis.

<4> on A-Axis Coordinate System

Figure 5A:
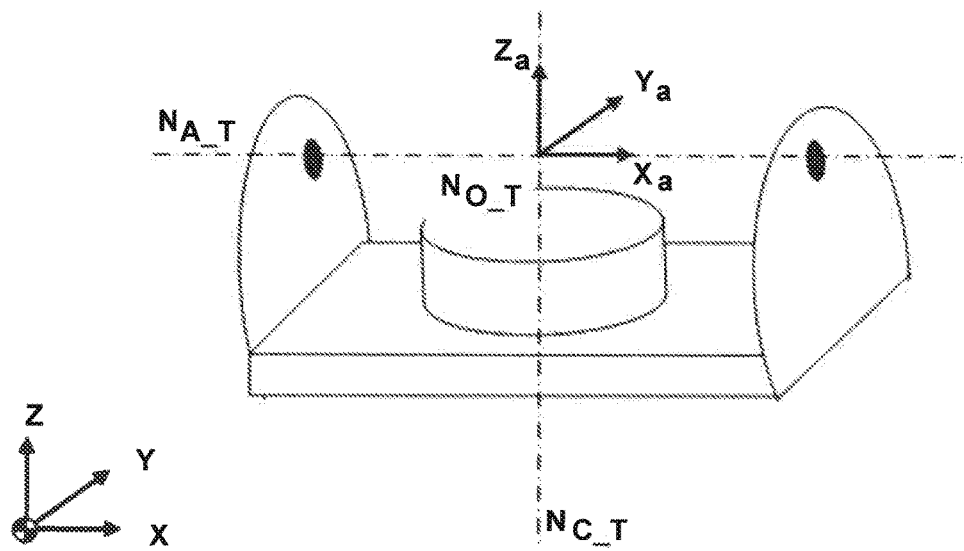
FIGS. 5A and 5B are views respectively illustrating the definition and motion of an A-axis coordinate system.

When two rotation axes are without an error, A equals 0 degrees, and C equals 0 degrees as shown in FIG. 5A, a coordinate system $X_aY_aZ_a$ in which the origin is the intersection $N_{O\_T}$ of the nominal A-axis rotation center line and the nominal C-axis rotation center line and the directions of X, Y, and Z are the same as in a machine coordinate system is assumed as the A-axis coordinate system.

Figure 5B:
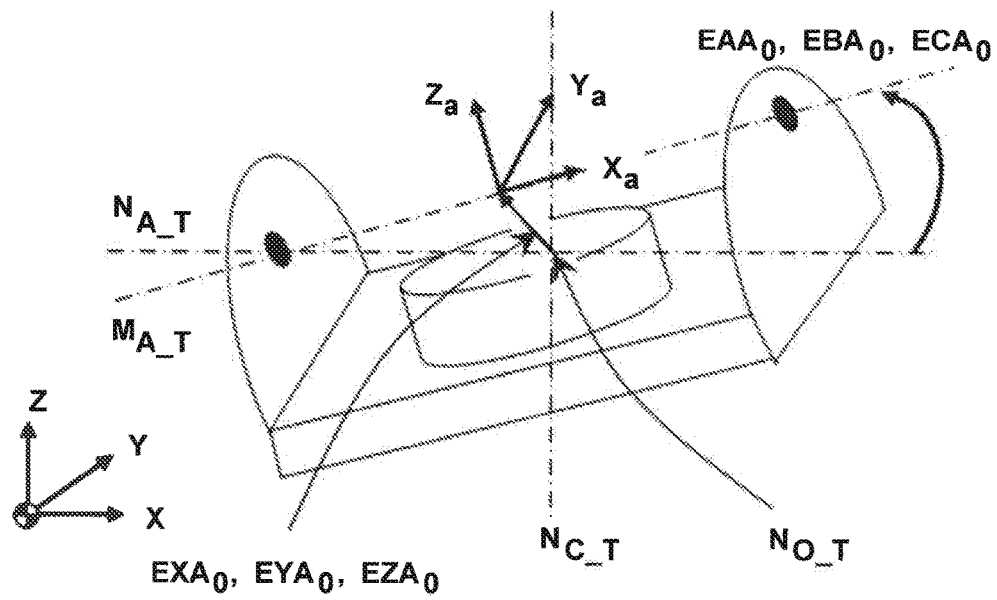

The A-axis coordinate system is fixed to the A-axis that is the rotation axis. FIG. 5B shows that the A-axis coordinate system is present on the A-axis that is the rotation axis having a translation and rotation error, when there are a translation error and rotation error dependent on the A-axis, A equals 0 degrees, and C equals 0 degrees.

<5> on Translation Error and Rotation Error Dependent on C-Axis when Seen from A-Axis Coordinate System When the C-axis is fixed at the arbitrary angle c and the A-axis is at 0 degrees, there are a translation error ($EXA_0$, $EYA_0$, $EZA_0$) and rotation error ($EAA_0$, $EBA_0$, $ECA_0$) dependent on the A-axis. Therefore, the A-axis coordinate system $X_a Y_a Z_a$ is present on the A-axis and is as shown in FIG. 6.

Figure 6:
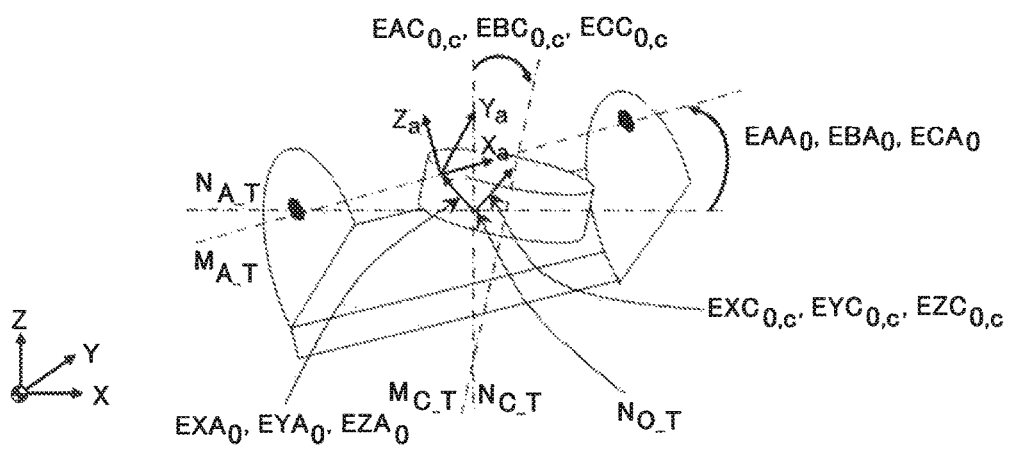
FIG. 6 is a view illustrating that there are a translation error ($EXC_{0,c}$, $EYC_{0,c}$, $EZC_{0,c}$) and rotation error ($EAC_{0,c}$, $EBC_{0,c}$, $ECC_{0,c}$) dependent on the C-axis when the C-axis is fixed at an arbitrary angle c and the A-axis is at 0 degrees.

When the C-axis is fixed at the arbitrary angle c and the A-axis is at 0 degrees as shown in FIG. 6, there are a translation error ($EXC_{0,c}$, $EYC_{0,c}$, $EZC_{0,c}$) and rotation error ($EAC_{0,c}$, $EBC_{0,c}$, $ECC_{0,c}$) dependent on the C-axis. The errors are all defined with the machine coordinate system XYZ.

Figure 7:
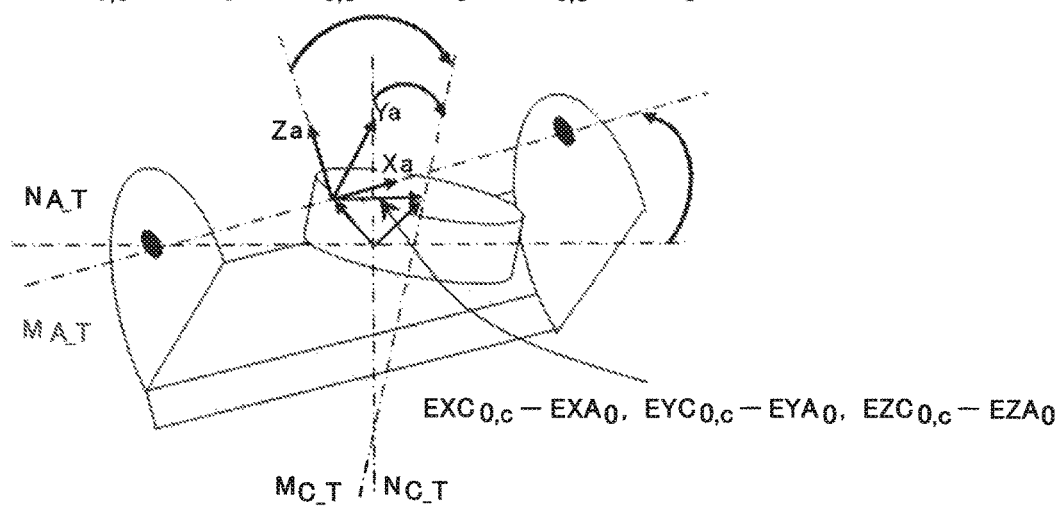
FIG. 7 is a view illustrating a case where the translation error ($EXC_{0,c}$, $EYC_{0,c}$, $EZC_{0,c}$) and rotation error ($EAC_{0,c}$, $EBC_{0,c}$, $ECC_{0,c}$) dependent on the C-axis that are defined with a machine coordinate system XYZ is transformed into the A-axis coordinate system.

When the translation error ($EXC_{0,c}$, $EYC_{0,c}$, $EZC_{0,c}$) and rotation error ($EAC_{0,c}$, $EBC_{0,c}$, $ECC_{0,c}$) dependent on the C-axis that are defined with the machine coordinate system XYZ is transformed into the A-axis coordinate system as shown in FIG. 7, the translation error and rotation error dependent on the C-axis when seen from the A-axis coordinate system are as follows.

When A=0 and C=c, the $X_a$ component, the $Y_a$ component, and the $Z_a$ component of the distance to $M_{c\_T}$ from $Z_a$ in the A-axis coordinate system $X_a Y_a Z_a$ are respectively assumed to be "$EXC_{0,c}$-$EXA_0$," "$EYC_{0,c}$-$EYA_0$," and "$EZC_{0,c}$-$EZA_0$."

When A=0 and C=c, the tilt about the Xa-axis, the tilt about the Ya-axis, and the tilt about the Za-axis of $M_{c\_T}$ with respect to $Z_a$ in the A-axis coordinate system $X_a Y_a Z_a$ are respectively assumed to be "$EAC_{0,c}$-$EAA_0$," "$EBC_{0,c}$-$EBA_0$," and "$ECC_{0,c}$-$ECA_0$."

Figure 8:
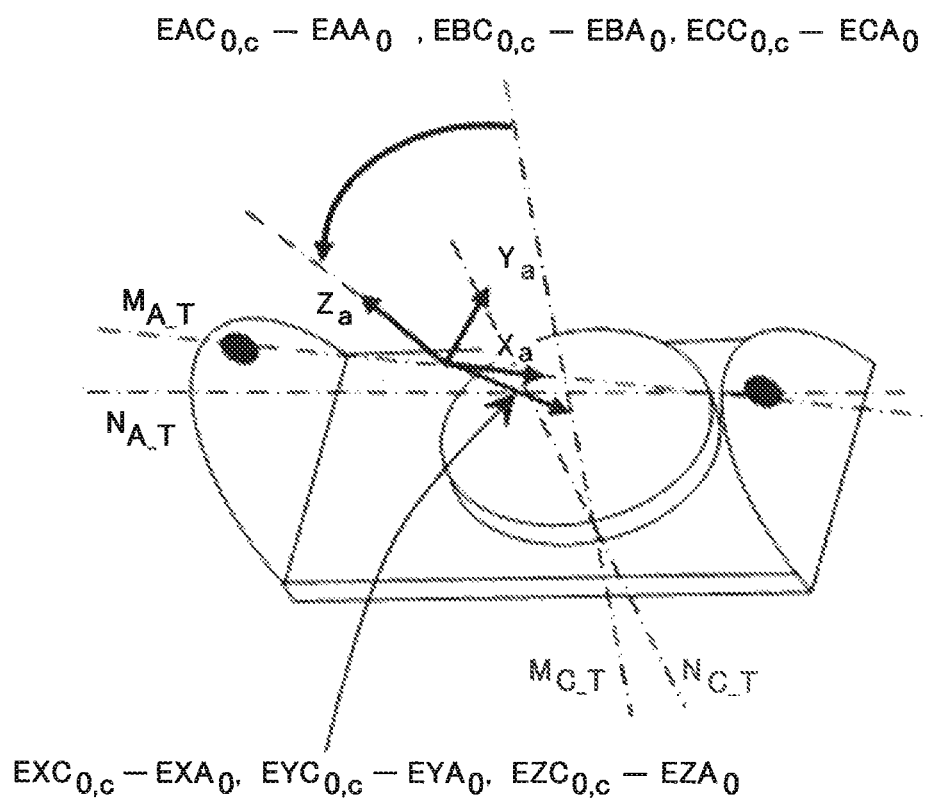
FIG. 8 is a view illustrating a case where the C-axis is fixed at the arbitrary angle c and a change is made for the A-axis to an angle a other than 0 degrees.

Next, as shown in FIG. 8, the C-axis is fixed at the arbitrary angle c, and a change is made for the A-axis to the angle a other than 0 degrees. Since the A-axis coordinate system $X_a Y_a Z_a$ is fixed to the A-axis that is the rotation axis, the A-axis coordinate system moves with the A-axis. Since the table that rotates about the C-axis is on the rotation axis A and the C-axis is fixed at the arbitrary angle c, the misaligned C-axis rotation center line $M_{c\_T}$ (see FIG. 7) when A=0 and C=c moves together with the A-axis, when a change is made for the A-axis to the angle a other than 0 degrees.

When the C-axis is fixed at the arbitrary angle c and a change is made for the A-axis to the angle a other than 0 degrees, the A-axis coordinate system $X_a Y_a Z_a$ and the misaligned C-axis rotation center line $M_{c\_T}$ when A=0 (degrees) and C=c (degrees) simultaneously move together with the A-axis. Accordingly, even if a change is made for the A-axis to the angle a other than 0 degrees, the translation error and rotation error dependent on the C-axis when seen from the A-axis coordinate system are the same as when A=0 and C=c. Thus, the translation error and rotation error dependent on the C-axis when seen from the A-axis coordinate system are "$EXC_{0,c}$-$EXA_0$," "$EYC_{0,c}$-$EYA_0$," "$EZC_{0,c}$-$EZA_0$," "$EAC_{0,c}$-$EAA_0$," "$EBC_{0,c}$-$EBA_0$," and "$ECC_{0,c}$-$ECA_0$."

The translation error and rotation error dependent on the C-axis when seen from the A-axis coordinate system for each position of division as shown in FIG. 3A are as shown in FIG. 9. A row (frame in dashed double-dotted line) in FIG. 9 shows the translation errors and rotation errors dependent on the C-axis when seen from the A-axis coordinate system for respective positions where the C-axis positions are the same. Since the translation error and rotation error dependent on the C-axis when seen from the A-axis coordinate system change depending on only the C-axis position c, the translation errors and rotation errors dependent on the C-axis when seen from the A-axis coordinate system are the same within a row in FIG. 9.

<6> on Necessary Measurement Data

From FIGS. 3A, 3B, and 9, combination of the translation error and rotation error dependent on the A-axis for each position of division as shown in FIG. 3A and the translation error and rotation error dependent on the C-axis when seen from the A-axis coordinate system is shown in FIG. 10. A column (for respective positions where the A-axis positions are the same) in FIG. 10 shows the translation error and rotation error dependent on the A-axis for each position where the A-axis positions are the same and the translation error and rotation error dependent on the C-axis when seen from the A-axis coordinate system where the A-axis positions are the same. A row (for respective positions where the C-axis positions are the same) in FIG. 10 shows the translation error and rotation error dependent on the A-axis for each position where the C-axis positions are the same and the translation error and rotation error dependent on the C-axis when seen from the A-axis coordinate system where the C-axis positions are the same.

Since the translation error and rotation error dependent on the A-axis do not change depending on the C-axis position but change depending on only the A-axis position a, the translation errors and rotation errors dependent on the A-axis are the same within a column (frame in broken line) in FIG. 10. Thus, it is not necessary to measure the translation error and rotation error dependent on the A-axis for each position of division as shown in FIG. 3A.

It is necessary to fix the C-axis at an arbitrary angle and measure only the translation error and rotation error dependent on the A-axis for each position of division on the A-axis. In this embodiment, the C-axis is fixed at 0 degrees. Thus, it is necessary to measure the translation error ($EXA_a$, $EYA_a$, $EZA_a$) and rotation error ($EAA_a$, $EBA_a$, $ECA_a$) (within a frame in broken line in FIG. 11B) dependent on the A-axis for each position (within a frame in broken line in FIG. 11A) where C=0 and A=a among the respective positions of division as shown in FIG. 3A.

Since the translation error and rotation error dependent on the C-axis when seen from the A-axis coordinate system do not change depending on the A-axis position and change depending on only the C-axis position c, the translation errors and rotation errors dependent on the C-axis when seen from the A-axis coordinate system are the same within a row (frame in dashed double-dotted line) in FIG. 10. In order to obtain the translation error and rotation error dependent on the C-axis when seen from the A-axis coordinate system, only the translation error ($EXC_{0,c}$, $EYC_{0,c}$, $EZC_{0,c}$) and the rotation error ($EAC_{0,c}$, $EBC_{0,c}$, $ECC_{0,c}$) dependent on the C-axis are necessary.

Figure 11A:
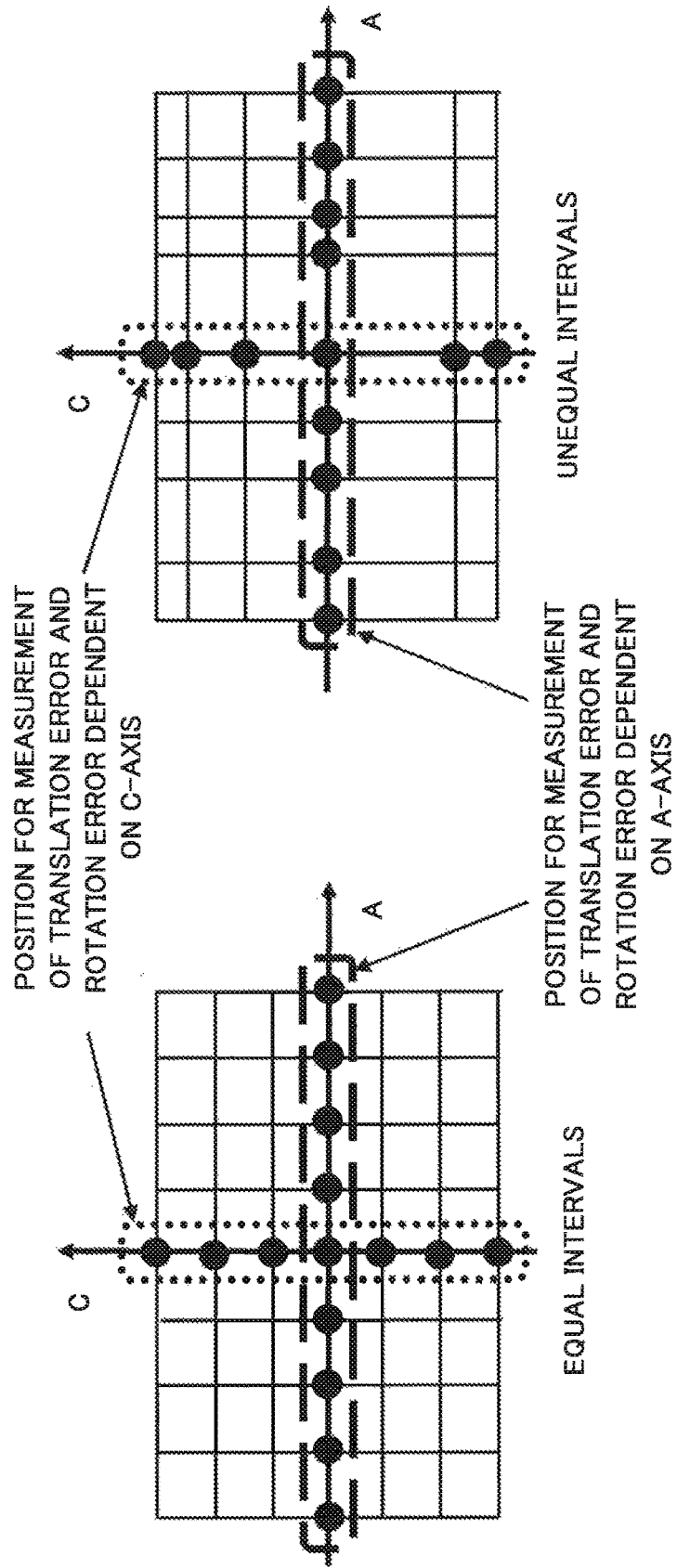
FIG. 11A is a view illustrating each position for measurement of error.

Thus, as shown in FIG. 11A, it is necessary to measure only the translation error ($EXC_{0,c}$, $EYC_{0,c}$, $EZC_{0,c}$) and the rotation error ($EAC_{0,c}$, $EBC_{0,c}$, $ECC_{0,c}$) (within a frame in dotted line in FIG. 11B) dependent on the C-axis for each position (within the frame in dotted line) where A=0 and C=c, among the respective positions of division as shown in FIG. 3A. An arithmetic measurement data input unit 21 (see FIG. 15) inputs the necessary measurement data. The measurement of the translation error and rotation error for each lattice point shown in FIGS. 11A and 11B may be performed using a method described in Japanese Patent Application Laid-open No. 2009-151756 mentioned above, for example.

Figures 11B, 12:
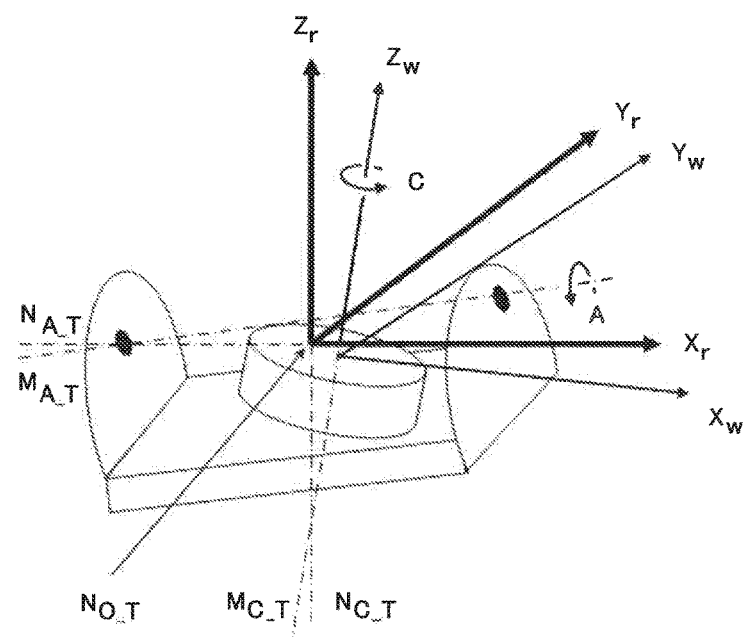
FIG. 11B is a view illustrating measurement data with respect to the A-axis and C-axis for the position for measurement of error.
FIG. 12 is a view for defining the coordinate system and the positive direction of rotation in order to obtain at least one of the translation error correction amount and rotation error correction amount dependent on the rotation axis.
Figure 13A:
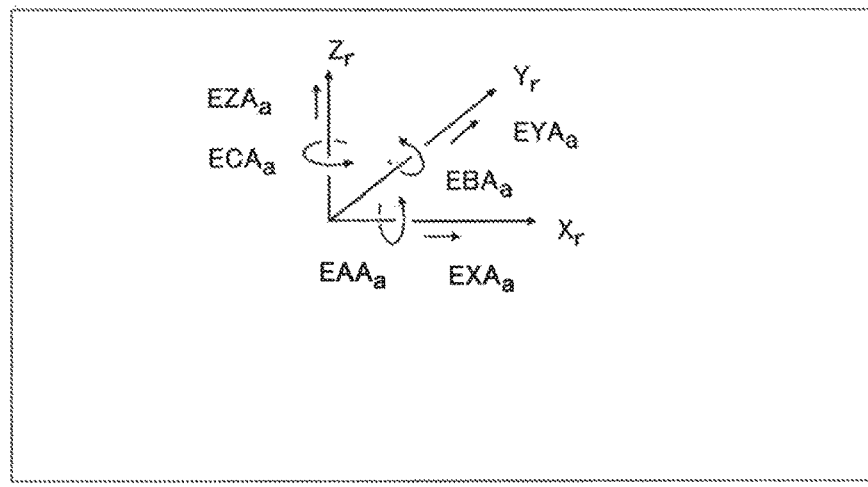
FIGS. 13A to 13H are views illustrating that a work coordinate system $X_w Y_w Z_w$ when a change is made to a for the A-axis being the rotation axis and to c for the C-axis being the rotation axis is obtained by transformation of a reference coordinate system $X_r Y_r Z_r$.
Figure 13B:
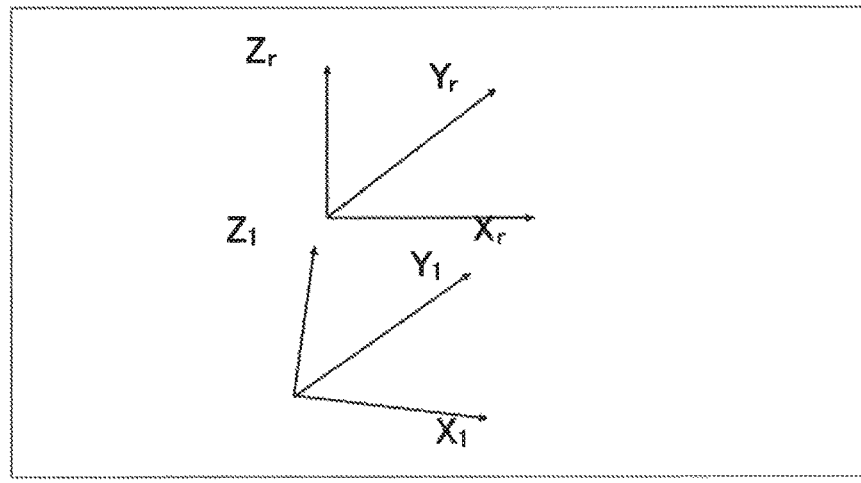
Figure 13C:
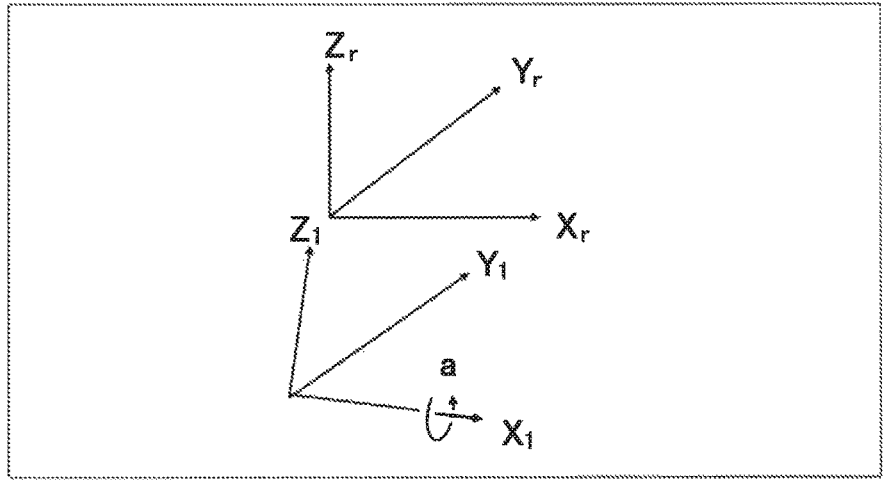
Figure 13D:
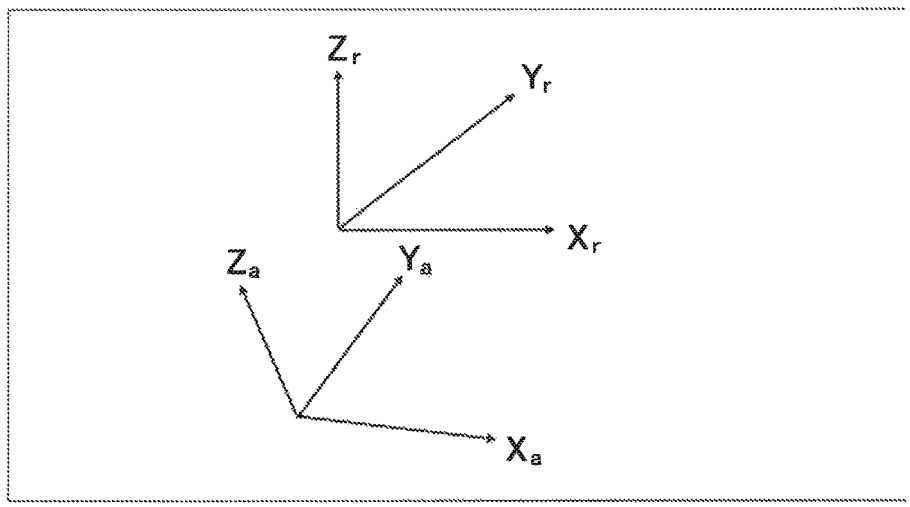
Figure 13E:
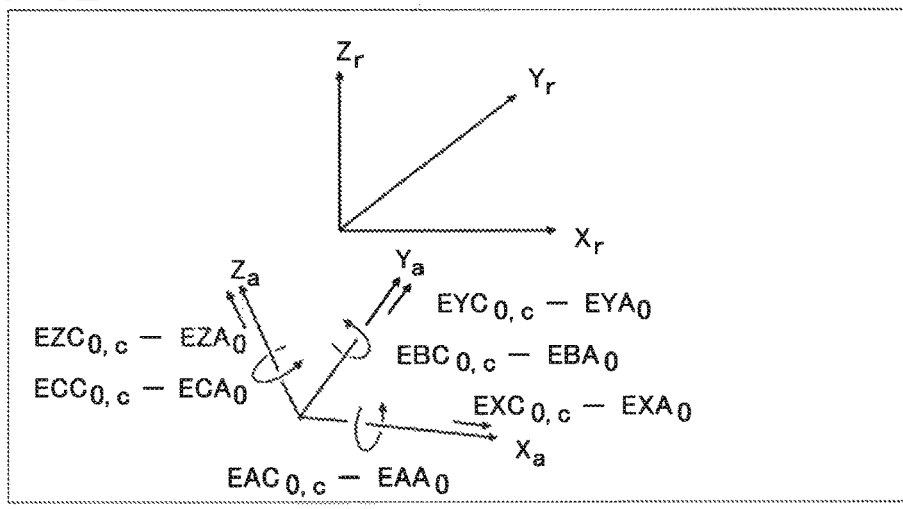
Figure 13F:
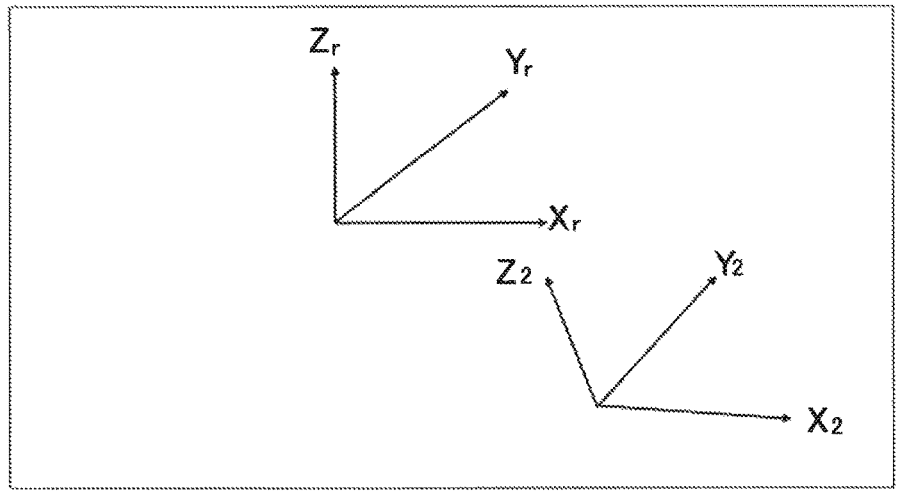
Figure 13G:
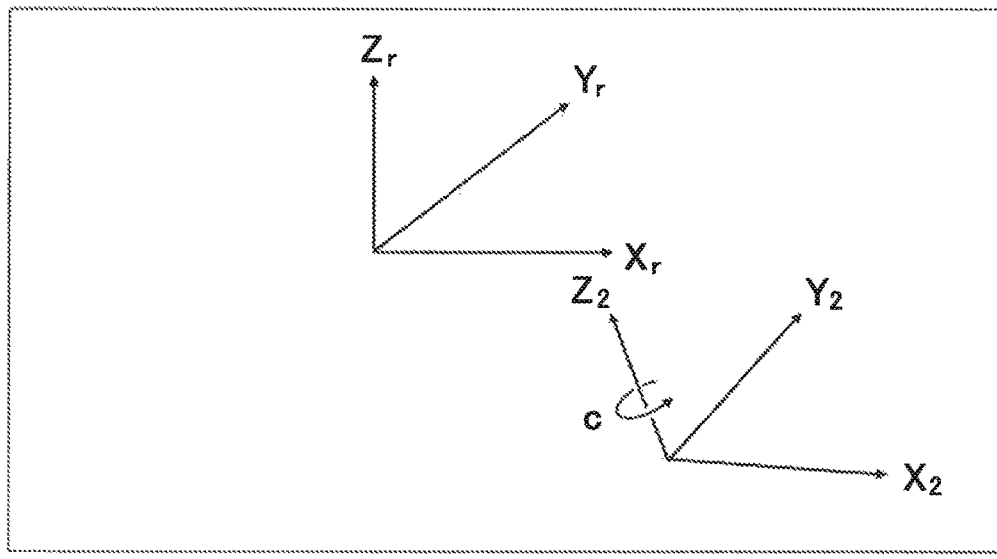
Figure 13H:
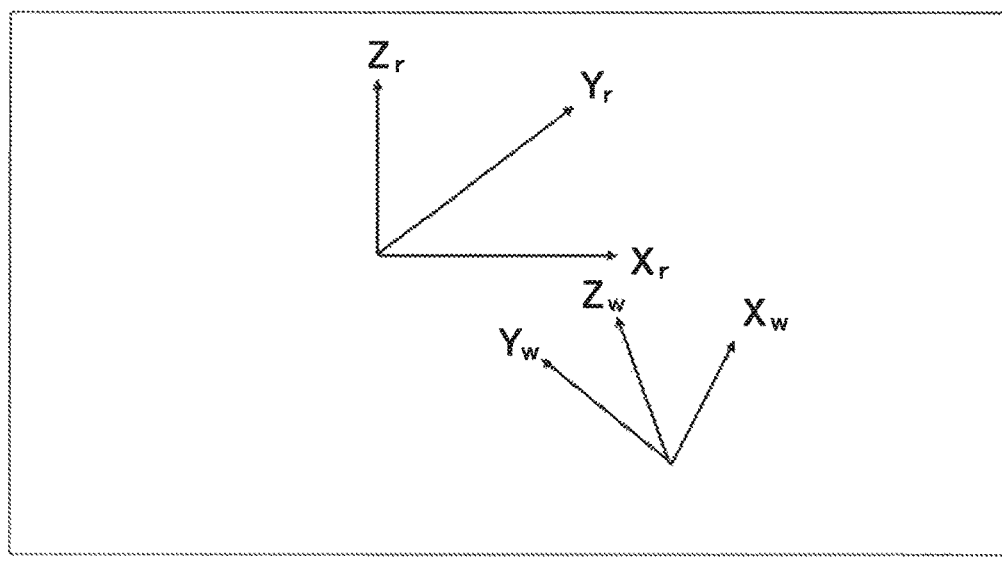

<7> on Translation Error Correction Amount and Rotation Error Correction Amount Dependent on Rotation Axis As shown in FIGS. 11A and 11B, the translation error and rotation error dependent on the A-axis for each position at which the two-dimensional coordinate system space with the two rotation axes is divided at equal intervals or unequal intervals in each axis direction and the translation error and rotation error dependent on the C-axis when seen from the A-axis coordinate system (see FIG. 10) can be calculated from a small amount of measurement data. As already described, the interval in the case of division at equal intervals may be an error interval set as an error interval parameter or may be an error interval instructed by a program. In the case of division at unequal intervals, an interval that changes in correspondence with the A-axis or C-axis position may be an error interval set as a plurality of error interval parameters or may be an error interval instructed by a program.

By obtaining at least one of the translation error correction amount and rotation error correction amount dependent on the rotation axis from the translation error and rotation error dependent on the A-axis and the translation error and rotation error dependent on the C-axis when seen from the A-axis coordinate system, it is possible to obtain at least one of the translation error correction amount and rotation error correction amount dependent on the rotation axis from a small amount of measurement data. An error correction amount arithmetic unit 23 (see FIG. 15) performs this calculation. In the error correction amount calculation, a squared term of the error correction amount is ignored. Regarding an error, $|e|\ll 1$, where e is the error. Therefore, with approximation, $\sin(e)=e$, and $\cos(e)=1$. The same applies in an embodiment below.

In order to obtain at least one of the translation error correction amount and rotation error correction amount dependent on the rotation axis, the following coordinate system and positive direction of rotation are defined as in FIG. 12. A reference coordinate system $X_r Y_r Z_r$ (stationary coordinate system) of which the origin is the intersection of the nominal A-axis rotation center line and the nominal C-axis rotation center line and the X, Y, and Z directions are the same as in the machine coordinate system is defined. In the same manner as for the definition of the A-axis coordinate system, a work coordinate system X Y Z (moving coordinate system) fixed to the C-axis that is the rotation axis is defined. The counterclockwise direction of rotation when seen from the terminal side of the rotating coordinate axis is the positive direction of rotation of the rotation axis.

By performing the following transformations [1] to [6] in order with the reference coordinate system $X_r Y_r Z_r$ as shown in FIGS. 13A to 13H, the work coordinate system $X_w Y_w Z_w$ in which a change is made respectively for the A-axis and C-axis as the rotation axes to a and c is obtained.

[1] Rotation by $EAA_a$, $EBA_a$, and $ECA_a$ about the $X_r$-, $Y_r$-, and $Z_r$-axes, with the reference coordinate system $X_r Y_r Z_r$ set as the reference coordinate system.

[2] Translation by $EXA_a$, $EYA_a$, and $EZA_a$ along the $X_r$-, $Y_r$-, and $Z_r$-axes (resulting in a coordinate system $X_1 Y_1 Z_1$ (in FIG. 13B)), with the reference coordinate system $X_r Y_r Z_r$ set as the reference coordinate system.

[3] Rotation by the angle a about the $X_1$-axis (resulting in the A-axis coordinate system $X_a Y_a Z_a$ (in FIGS. 13C and 13D)), with the coordinate system $X_1 Y_1 Z_1$ set as the reference coordinate system.

[4] Rotation by "$EAC_{0,c}$-$EAA_0$," "$EBC_{0,c}$-$EBA_0$," and "$ECC_{0,c}$-$ECA_0$" about the $X_a$-, $Y_a$-, and $Z_a$-axes, with the A-axis coordinate system $X_a Y_a Z_a$ set as the reference coordinate system.

[5] Translation by "$EXC_{0,c}$-$EXA_0$," "$EYC_{0,c}$-$EYA_0$," and "$EZC_{0,c}$-$EZA_0$" along the $X_a$-, $Y_a$-, and $Z_a$-axes (resulting in a coordinate system $X_2 Y_2 Z_2$ (in FIG. 13F)), with the A-axis coordinate system $X_a Y_a Z_a$ set as the reference coordinate system.

[6] Rotation by the angle c about the $Z_2$-axis (resulting in the work coordinate system $X_w Y_w Z_w$ (in FIGS. 13G and 13H)), with the coordinate system $X_2 Y_2 Z_2$ as the reference coordinate system.

With the transformations described above, a homogenous coordinate transformation matrix $^rT_w$ for the reference coordinate system $X_r Y_r Z_r$ to the work coordinate system $X_w Y_w Z_w$ is obtained by the following expression (1).

$$^rT_w = {^rT_1}\,{^1T_a}\,{^aT_2}\,{^2T_w} \qquad (1)$$

$^rT_1$: Homogenous coordinate transformation matrix for reference coordinate system $X_r Y_r Z_r$ to coordinate system $X_1 Y_1 Z_1$ $^1T_a$: Homogenous coordinate transformation matrix for coordinate system $X_1 Y_1 Z_1$ to A-axis coordinate system $X_a Y_a Z_a$ $^aT_2$: Homogenous coordinate transformation matrix for A-axis coordinate system $X_a Y_a Z_a$ to coordinate system $X_2 Y_2 Z_2$ $^2T_w$: Homogenous coordinate transformation matrix for coordinate system $X_2 Y_2 Z_2$ to work coordinate system $X_w Y_w Z_w$ When the translation errors and rotation errors dependent on the A-axis and the C-axis are taken into consideration, the actual position of the table in the reference coordinate system $X_r Y_r Z_r$ is as in the following expression (2).

$$^rp = {^rT_w}({^r\tilde{T}_w})^{-1}\,{^r\tilde{p}}$$

$$= \begin{bmatrix} 1 & -\gamma & \beta & \delta X \\ \gamma & 1 & -\alpha & \delta Y \\ -\beta & \alpha & 1 & \delta Z \\ 0 & 0 & 0 & 1 \end{bmatrix} {^r\tilde{p}}$$

where $\delta X = EXA_a + (EXC_{0,c} - EXA_0)$ $\delta Y = EYA_a + (EYC_{0,c} - EYA_0)\cos(a) - (EZC_{0,c} - EZA_0)\sin(a)$ $\delta Z = EZA_a + (EZC_{0,c} - EZA_0)\cos(a) - (EYC_{0,c} - EYA_0)\sin(a)$ $\alpha = EAA_a + (EAC_{0,c} - EAA_0)$ $\beta = EBA_a + (EBC_{0,c} - EBA_0)\cos(a) - (ECC_{0,c} - ECA_0)\sin(a)$ $\gamma = ECA_a + (ECC_{0,c} - ECA_0)\cos(a) - (EBC_{0,c} - EBA_0)\sin(a)$ $^r\tilde{p}$: Correct position of table in reference coordinate system $X_r Y_r Z_r$ $^rp$: Actual position of table in reference coordinate system $X_r Y_r Z_r$ $^r\tilde{T}_w$: Homogenous coordinate transformation matrix for reference coordinate system $X_r Y_r Z_r$ to work coordinate system $X_r, Y_r, Z_r$ when two rotation axes are without error (2)

When the translation error correction amount and rotation error correction amount dependent on the rotation axis are such that an X component $\Delta X2_{a,c}$, a Y component $\Delta Y2_{a,c}$, and a Z component $\Delta Z2_{a,c}$ of the translation error correction amount for movement of the rotation axis when A=a and C=c are sufficiently small and a tilt $\Delta I2_{a,c}$ about the X-axis, a tilt $\Delta J2_{a,c}$ about the Y-axis, and a tilt $\Delta K2_{a,c}$ about the Z-axis of the rotation error correction amount for movement of the rotation axis when A=a and C=c are sufficiently small, a transformation matrix with the correction amounts is the following expression (3).

$$\begin{bmatrix} 1 & 0 & 0 & \Delta X2_{a,c} \\ 0 & 1 & 0 & 0 \\ 0 & 0 & 1 & 0 \\ 0 & 0 & 0 & 1 \end{bmatrix} \begin{bmatrix} 1 & 0 & 0 & 0 \\ 0 & 1 & 0 & \Delta Y2_{a,c} \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & \Delta Z2_{a,c} \\ 0 & 0 & 0 & 1 \end{bmatrix} \quad (3)$$

$$\begin{bmatrix} 1 & 0 & 0 & 0 \\ 0 & \cos(\Delta I2_{a,c}) & -\sin(\Delta I2_{a,c}) & 0 \\ 0 & \sin(\Delta I2_{a,c}) & \cos(\Delta I2_{a,c}) & 0 \\ 0 & 0 & 0 & 1 \end{bmatrix}$$

$$\begin{bmatrix} \cos(\Delta J2_{a,c}) & 0 & \sin(\Delta J2_{a,c}) & 0 \\ 0 & 1 & 0 & 0 \\ -\sin(\Delta J2_{a,c}) & 0 & \cos(\Delta J2_{a,c}) & 0 \\ 0 & 0 & 0 & 1 \end{bmatrix}$$

$$\begin{bmatrix} \cos(\Delta K2_{a,c}) & -\sin(\Delta K2_{a,c}) & 0 & 0 \\ \sin(\Delta K2_{a,c}) & \cos(\Delta K2_{a,c}) & 0 & 0 \\ 0 & 0 & 1 & 0 \\ 0 & 0 & 0 & 1 \end{bmatrix}$$

$$\begin{bmatrix} 1 & -\Delta K2_{a,c} & \Delta J2_{a,c} & \Delta X2_{a,c} \\ \Delta K2_{a,c} & 1 & -\Delta I2_{a,c} & \Delta Y2_{a,c} \\ -\Delta J2_{a,c} & \Delta I2_{a,c} & 1 & \Delta Z2_{a,c} \\ 0 & 0 & 0 & 1 \end{bmatrix}$$

Assuming that the transformation matrix in expression (2) and expression (3) are equal, the following expression (4) is obtained.

$\Delta X2_{a,c} = EXA_a + (EXC_{0,c} - EXA_0)$ $\Delta Y2_{a,c} = EYA_a + (EYC_{0,c} - EYA_0)\cos(a) - (EZC_{0,c} - EZA_0)\sin(a)$ $\Delta Z2_{a,c} = EZA_a + (EZC_{0,c} - EZA_0)\cos(a) + (EYC_{0,c} - EYA_0)\sin(a)$ $\Delta I2_{a,c} = EAA_a + (EAC_{0,c} - EAA_0)$ $\Delta J_{a,c} = EBA_a + (EBC_{0,c} - EBA_0)\cos(a) - (ECC_{0,c} - ECA_0)\sin(a)$ $\Delta K2_{a,c} = ECA_a + (ECC_{0,c} - ECA_0)\cos(a) + (EBC_{0,c} - EBA_0)\sin(a)$ (4)

While the translation error correction amount dependent on the rotation axis and the rotation error correction amount dependent on the rotation axis are obtained simultaneously in expression (4), only one of the translation error correction amount and rotation error correction amount dependent on the rotation axis may be obtained. That is, it may be such that only one of the translation error correction amount dependent on the rotation axis and the rotation error correction amount dependent on the rotation axis is obtained by the calculation described above.

<8> on Input of Translation Error Correction Amount and Rotation Error Correction Amount As in the technique described in Japanese Patent Application Laid-open No. 2009-151756 mentioned above, there is a numerical controller having, within the device, an error correction table of the translation error correction amount and the rotation error correction amount as shown in FIGS. 14A and 14B. For the error correction table, a two-dimensional coordinate system space with two rotation axes is divided into lattice regions at equal intervals or unequal intervals in each axis direction (see FIG. 14A) with a method similar to the dividing method in FIG. 3A. At least one of a translation error correction amount ($\Delta X_{ai,cj}$, $\Delta Y_{ai,cj}$, $\Delta Z_{ai,cj}$) and rotation error correction amount ($\Delta I_{ai,cj}$, $\Delta J_{ai,cj}$, $\Delta K_{ai,cj}$) corresponding to each lattice point (ai, cj) (i=1, 2, . . . , m and j=1, 2, . . . , n) (see FIG. 14B) is set in the numerical controller.

The interval in the case of dividing the rotational axes into lattice regions at equal intervals may be a correction interval set as a correction interval parameter or may be a correction interval instructed by a program. In the case of dividing the rotational axes into lattice regions at unequal intervals, an interval that changes in correspondence with the A-axis or C-axis position may be a correction interval set as a plurality of correction interval parameters or may be a correction interval instructed by a program.

Figure 15:
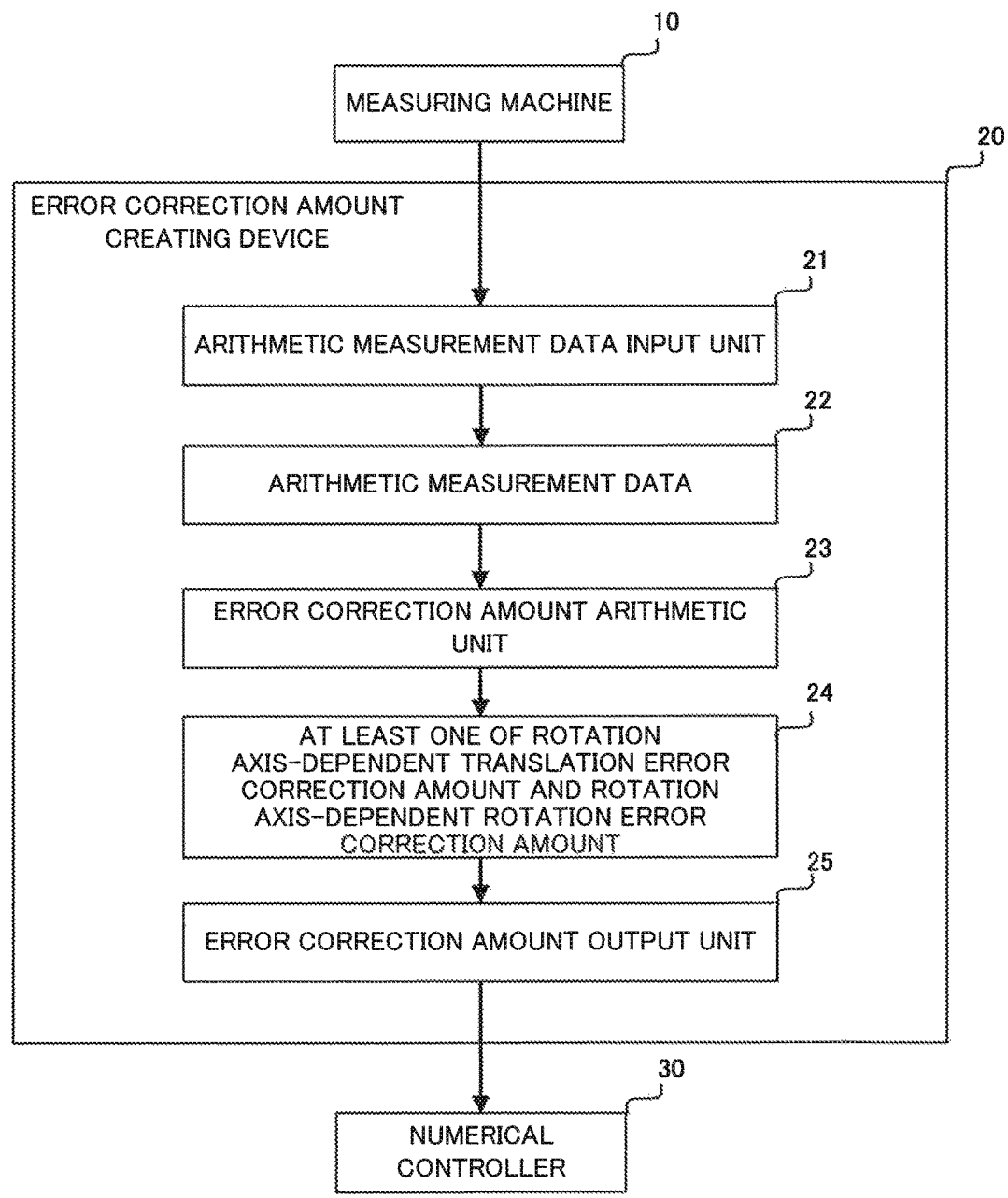
FIG. 15 is a view illustrating that at least one of a translation error correction amount ($\Delta X_{ai,cj}$, $\Delta Y_{ai,cj}$, $\Delta Z_{ai,cj}$) and a rotation error correction amount ($\Delta I_{ai,cj}$, $\Delta J_{ai,cj}$, $\Delta K_{ai,cj}$) for (ai, cj) can be obtained to be output to and set in a numerical controller.
Figure 16:
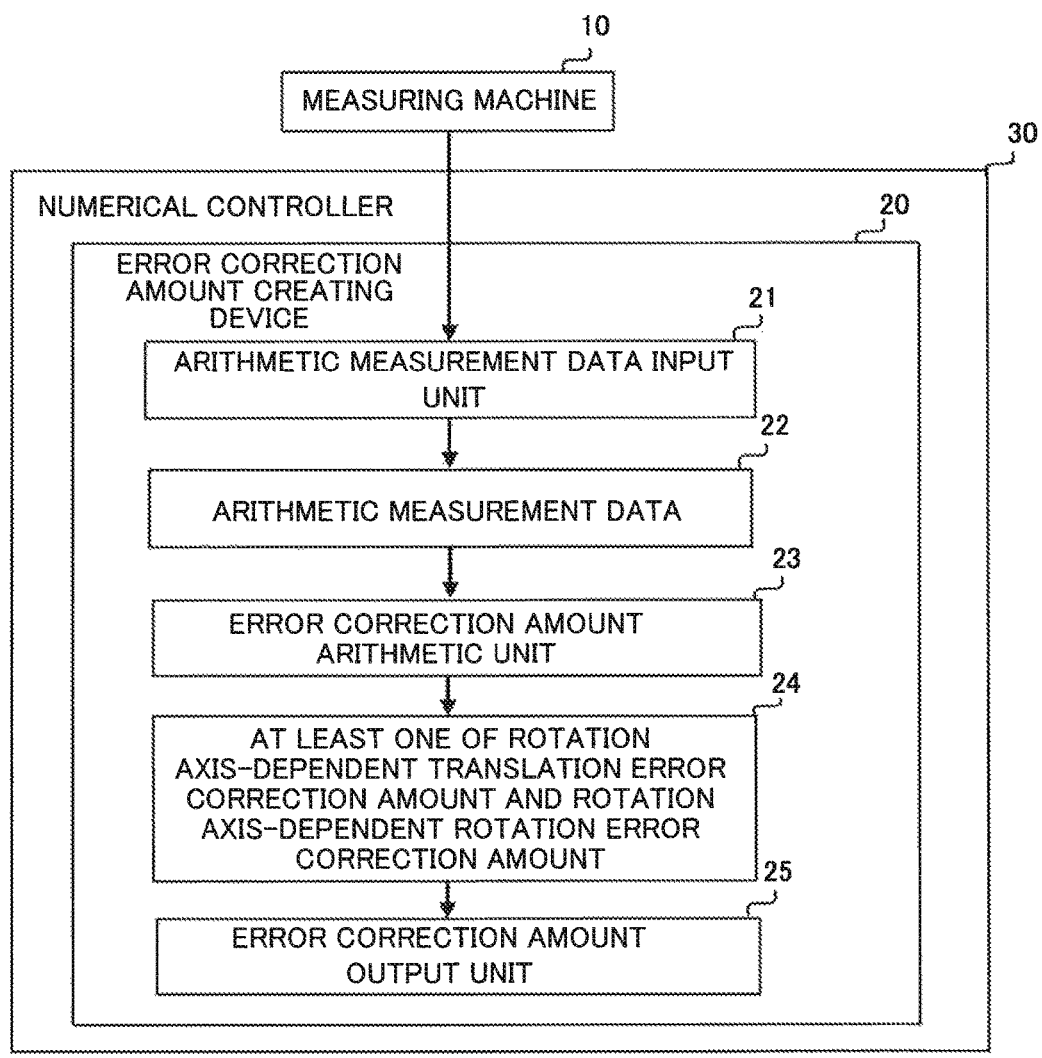
FIG. 16 is a view illustrating the configuration in which the numerical controller includes a translation and rotation error correction amount creating device.

In contrast, in the present invention, at least one of the translation error correction amount $\Delta X_{ai,cj}$, $\Delta Y_{ai,cj}$, $\Delta Z_{ai,cj}$) and rotation error correction amount ($\Delta I_{ai,cj}$, $\Delta J_{ai,cj}$, $\Delta K_{ai,cj}$) for (ai, cj) can be obtained with expression (4) to be output to and set in the numerical controller. FIG. 15 is a block diagram in this case. In an error correction amount creating device 20, arithmetic measurement data is input from a measuring machine 10 by the arithmetic measurement data input unit, the error correction amount arithmetic unit 23 computes at least one of the translation error correction amount and rotation error correction amount dependent on the rotation axis with the measurement data, and an error correction amount output unit 25 outputs at least one of the translation error correction amount and the rotation error correction amount to a numerical controller 30. The configuration may be such that the translation and rotation error correction amount creating device 20 is present within the numerical controller 30, as in FIG. 16.

Figure 17:
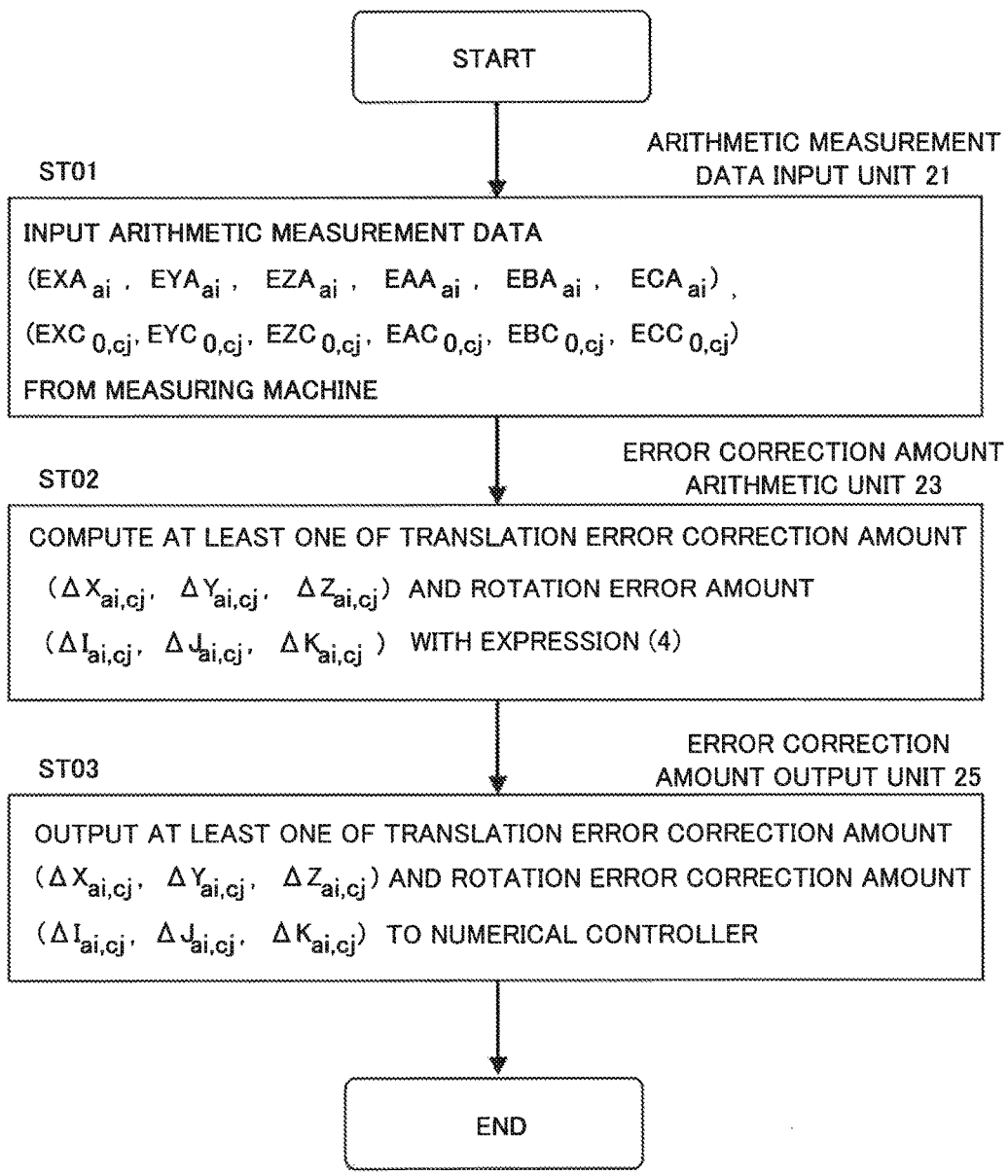
FIG. 17 is a flowchart illustrating a process of an arithmetic measurement data input unit, a translation and rotation error correction amount arithmetic unit, and a translation and rotation error correction amount output unit in a first embodiment.

FIG. 17 is view showing a flowchart for the arithmetic measurement data input unit, the translation and rotation error correction amount arithmetic unit, and the translation and rotation error correction amount output unit in the first embodiment. Each step will be described below.

[Step ST01] Arithmetic measurement data ($EXA_{ai}$, $EYA_{ai}$, $EZA_{ai}$, $EAA_{ai}$, $EBA_{ai}$, $ECA_{ai}$) and ($EXC_{0,cj}$, $EYC_{0,cj}$, $EZC_{0,cj}$, $EAC_{0,cj}$, $EBC_{0,cj}$, $ECC_{0,cj}$) are input from the measuring machine 10.

[Step ST02] At least one of the translation error correction amount ($\Delta X_{ai,cj}$, $\Delta Y_{ai,cj}$, $\Delta Z_{ai,cj}$) and the rotation error correction amount ($\Delta I_{ai,cj}$, $\Delta J_{ai,cj}$, $\Delta K_{ai,cj}$) is computed with expression (4).

[Step ST03] At least one of the translation error correction amount ($\Delta X_{ai,cj}$, $\Delta Y_{ai,cj}$, $\Delta Z_{ai,cj}$) and the rotation error correction amount ($\Delta I_{ai,cj}$, $\Delta J_{ai,cj}$, $\Delta K_{ai,cj}$) is input to the numerical controller 30, and the process is terminated.

Herein, step ST01 corresponds to the arithmetic measurement data input unit 21, step ST02 to the error correction amount arithmetic unit 23, and step ST03 to the error correction amount output unit 25.

Second Embodiment

<1> on Intended Machine and Error

Figure 18:
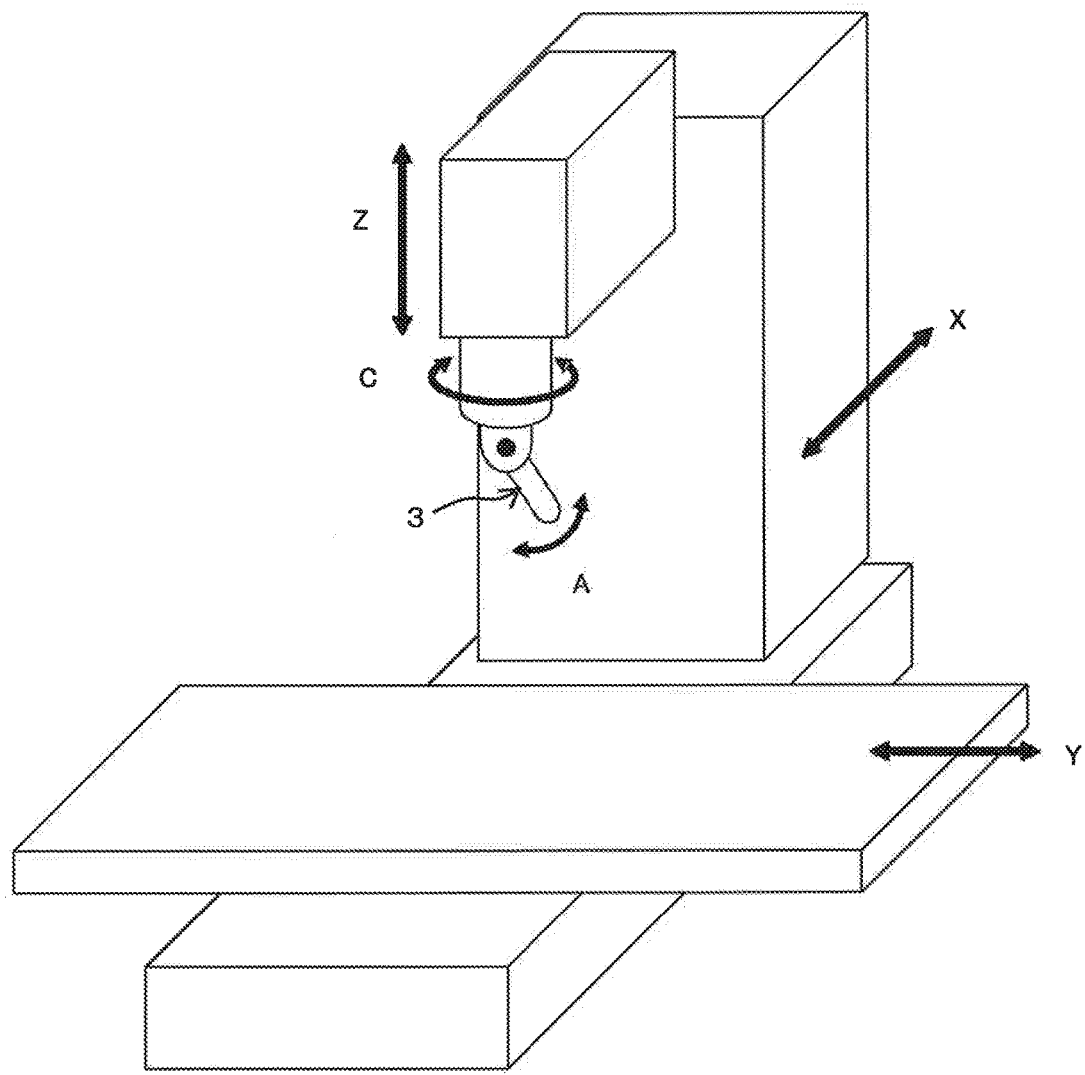
FIG. 18 is a view showing a tool head rotating five-axis machine having two rotation axes without an error.

FIG. 18 shows a tool head rotating five-axis machine having two rotation axes without an error. A tool head rotates about the C-axis and A-axis and moves along the X-axis and the Z-axis. A table moves along the Y-axis. The machine may be of other configurations as long as the tool head rotates about two rotation axes.

Figure 19:
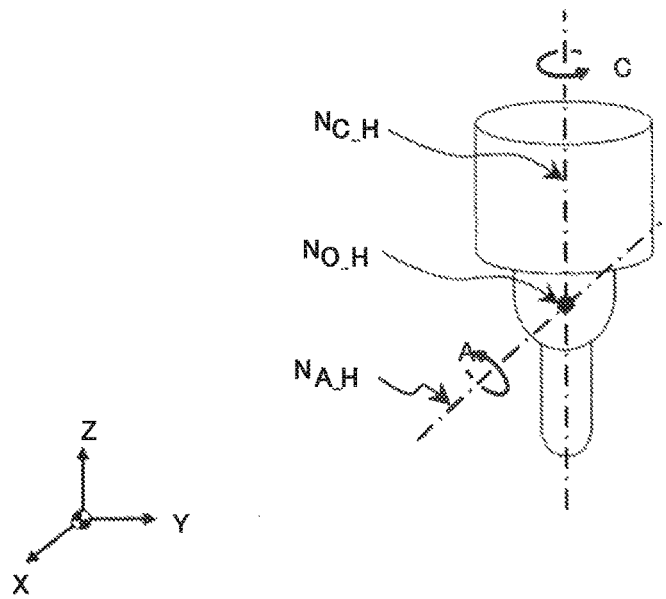
FIG. 19 is a view illustrating that the tool direction of a tool head is the Z-axis direction when the two axes are without an error and A equals 0 degrees.

When the two rotation axes are without an error and A=0 (degrees), the tool direction of the tool head is the Z-axis direction, as in FIG. 19. A nominal A-axis rotation center line $N_{A\_H}$ and a nominal C-axis rotation center line $N_{c\_H}$ are orthogonal at an intersection $N_{O\_H}$ to each other. Herein, "$\_H$" indicates data that forms an error of the tool head. The position instruction with respect to the A-axis and C-axis that are the rotation axes is assumed as (c, a).

As the translation error of the C-axis, there are the radial direction motion EXC in the X-direction, the radial direction motion EYC in the Y-direction, and the axis direction motion EZC. As the rotation error of the C-axis, there are the tilt motion EAC about the X-axis, the tilt motion EBC about the Y-axis, and the angle positioning error ECC. As the translation error of the A-axis, there are the radial direction motion EXA in the X-direction, the radial direction motion EYA in the Y-direction, and the axis direction motion EZA. As the rotation error of the A-axis, there are the tilt motion EAA about the X-axis, the tilt motion about EBA about the Y-axis, and the angle positioning error ECA.

<2> on Translation Error and Rotation Error of C-Axis

Figure 20:
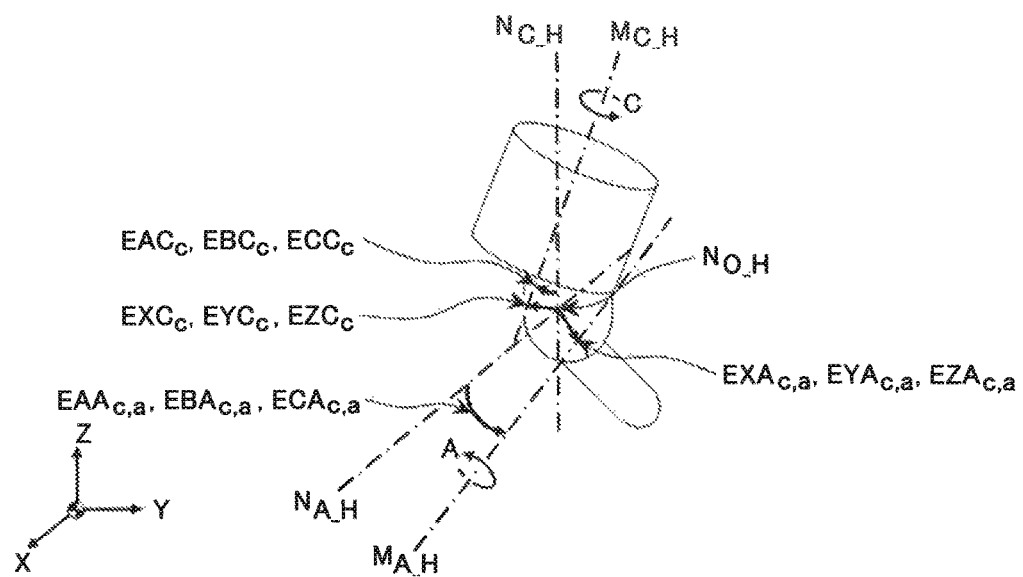
FIG. 20 is a view showing the translation error and rotation error of the C-axis.

FIG. 20 shows the translation error and rotation error of the C-axis. Although the actual errors are small, the errors are depicted with an exaggeration in FIG. 20. The translation error and rotation error of the C-axis are defined with the machine coordinate system XYZ. The translation error of the C-axis is the respective X, Y, and Z components of the distance to $M_{c\_H}$ from $N_{c\_H}$ at $N_{O\_H}$ that is the intersection of the nominal C-axis rotation center line and the nominal A-axis rotation center line. The rotation error of the C-axis is the tilt about the X-axis, the Y-axis, and the Z-axis of $M_{c\_H}$ with respect to $N_{c\_H}$.

The translation error and rotation error of the C-axis change depending on the C-axis position c. Therefore, regarding the translation error and rotation error of the C-axis that change depending on the C-axis position c in the present invention, the X component, the Y component, and the Z component of the distance to $M_{c\_H}$ from $N_{c\_H}$ are respectively assumed as EXC(c), EYC(c), and EZC(c) when C=c, and the tilt about the X-axis, the tilt about the Y-axis, and the tilt about the Z-axis of $M_{c\_H}$ with respect to $N_{c\_H}$ are respectively assumed as EAC(c), EBC(c), and ECC(c) when C=c.

Hereinafter, for the sake of simplification, "EXC(c)," "EYC(c)," "EZC(c)," "EAC(c)," "EBC(c)," and "ECC(c)" that are the translation error and rotation error of the C-axis are represented as "$EXC_c$," "$EYC_c$," "$EZC_c$," "$EAC_c$," "$EBC_c$," and "$ECC_c$."

<3> on Translation Error and Rotation Error of A-Axis

FIG. 20 shows the translation error and rotation error of the A-axis. Although the actual errors are small, the errors are depicted with an exaggeration in FIG. 20. The translation error and rotation error of the A-axis are defined with the machine coordinate system XYZ. The translation error of the A-axis is the respective X, Y, and Z components of the distance to $M_{A\_H}$ from $N_{A\_H}$ at $N_{O\_H}$ that is the intersection of the nominal C-axis rotation center line and the nominal A-axis rotation center line. The rotation error of the A-axis is the tilt about the X-axis, the Y-axis, and the Z-axis of $M_{A\_H}$ with respect to $N_{A\_H}$.

The translation error and rotation error of the A-axis change depending on the C-axis position c and the A-axis position a. Therefore, regarding the translation error and rotation error of the A-axis that change depending on c and a in the present invention, the X component, the Y component, and the Z component of the distance to $M_{A\_H}$ from $N_{A\_H}$ are respectively assumed as EXA(c, a), EYA(c, a), and EZA(c, a) when C=c and A=a, and the tilt about the X-axis, the tilt about the Y-axis, and the tilt about the Z-axis of $M_{A\_H}$ with respect to $N_{A\_H}$ are respectively assumed as EAA(c, a), EBA(c, a), and ECA(c, a) when C=c an A=a.

Hereinafter, for the sake of simplification, "EXA(c, a)," "EYA(c, a)," "EZA(c, a)," "EAA(c, a)," "EBA(c, a)," and "ECA(c, a)" that are the translation error and rotation error of the A-axis are represented as "$EXA_{c,a}$," "$EYA_{c,a}$," "$EZA_{c,a}$," "$BAA_{c,a}$," "$EBA_{c,a}$," and "$ECA_{c,a}$."

<4> on C-Axis Coordinate System

Figure 21A:
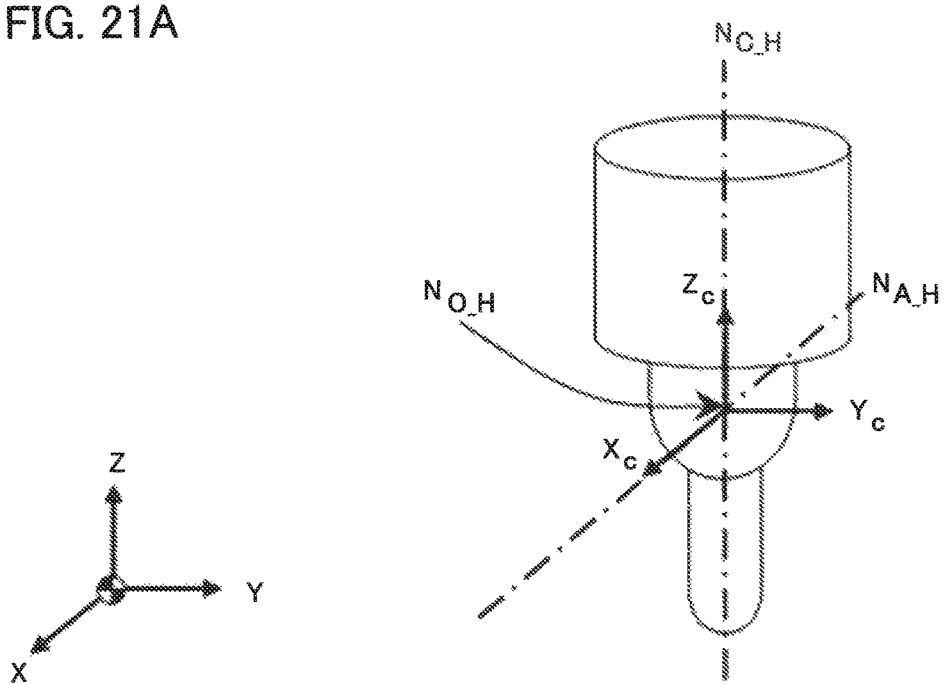
FIGS. 21A and 21B are views respectively illustrating the definition and motion of a C-axis coordinate system.

When two rotation axes are without an error, C=0, and A=0 as shown in FIG. 21A, a coordinate system $X_c Y_c Z_c$ in which the origin is the intersection $N_{O\_H}$ of the nominal C-axis rotation center line and the nominal A-axis rotation center line and the directions of X, Y, and Z are the same as in a machine coordinate system is assumed as the C-axis coordinate system.

Figure 21B:
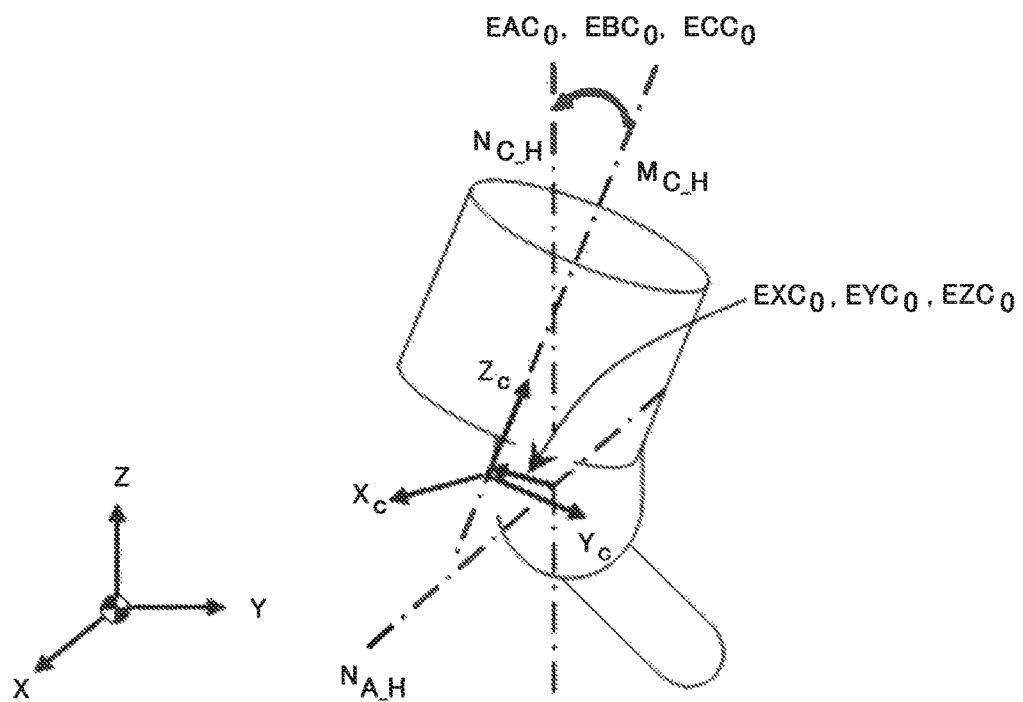

The C-axis coordinate system is fixed to the C-axis that is the rotation axis. FIG. 21B shows that the C-axis coordinate system is present on the C-axis that is the rotation axis having a translation and rotation error, when there are a translation error and rotation error dependent on the C-axis, C=0, and A=0.

Figure 22A:
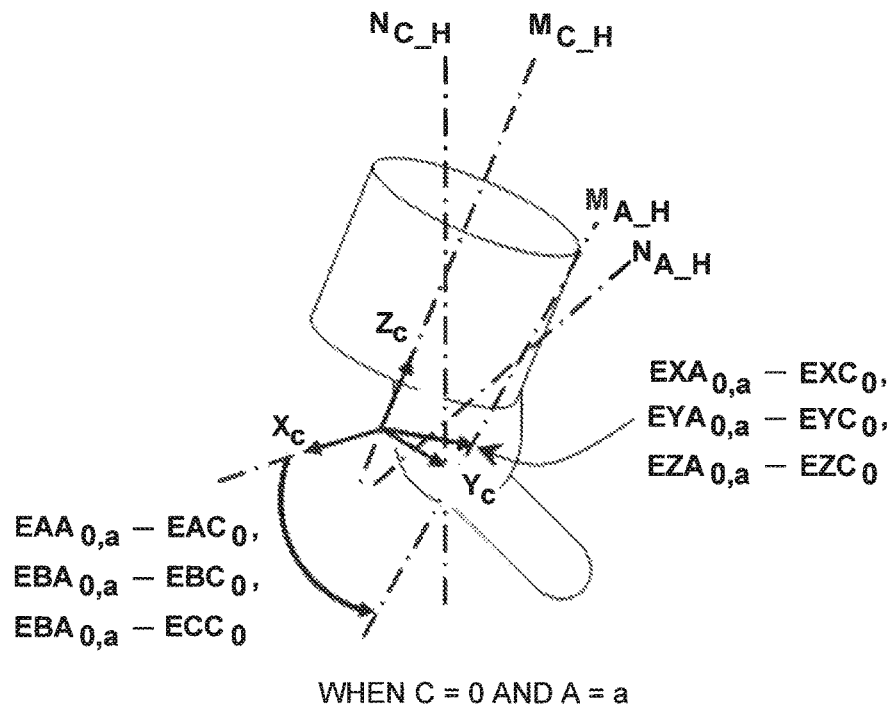
FIG. 22A is a view illustrating the translation error and rotation error dependent on the A-axis when seen from the C-axis coordinate system (when the A-axis is fixed at the arbitrary angle a and a change is made for the C-axis to 0 degrees)

<5> on Translation Error and Rotation Error Dependent on A-Axis when Seen from C-Axis Coordinate System When the A-axis is fixed at an arbitrary angle a and the C-axis is at 0 degrees as shown in FIG. 22A and a translation error ($EXA_{0,a}$, $EYA_{0,a}$, $EZA_{0,a}$) and rotation error ($EAA_{0,a}$, $EBA_{0,a}$, $ECA_{0,a}$) dependent on the A-axis that are defined with the machine coordinate system XYZ are transformed into the C-axis coordinate system, the translation error and rotation error dependent on the A-axis when seen from the C-axis coordinate system are such that the $X_c$ component, the $Y_c$ component, and the $Z_c$ component of the distance to $M_{A\_H}$ from $Z_0$ in the C-axis coordinate system $X_c Y_c Z_c$ are respectively "$EXA_{0,a}$-$EXC_0$," "$EYA_{0,a}$-$EYC_0$," and "$EZA_{0,a}$-$EZC_0$" when C=0 and A=a, and the tilt about the $X_c$-axis, the tilt about the $Y_c$-axis, and the tilt about the $Z_n$-axis of $M_{A\_H}$ with respect to $Z_c$ in the C-axis coordinate system $X_c Y_c Z_c$ are respectively "$EAA_{0,a}$-$EAC_0$," "$EBA_{0,a}$-$EBC_O$," and "$ECA_{0,a}$-$ECC_0$" when C=0 and A=a.

Figure 22B:
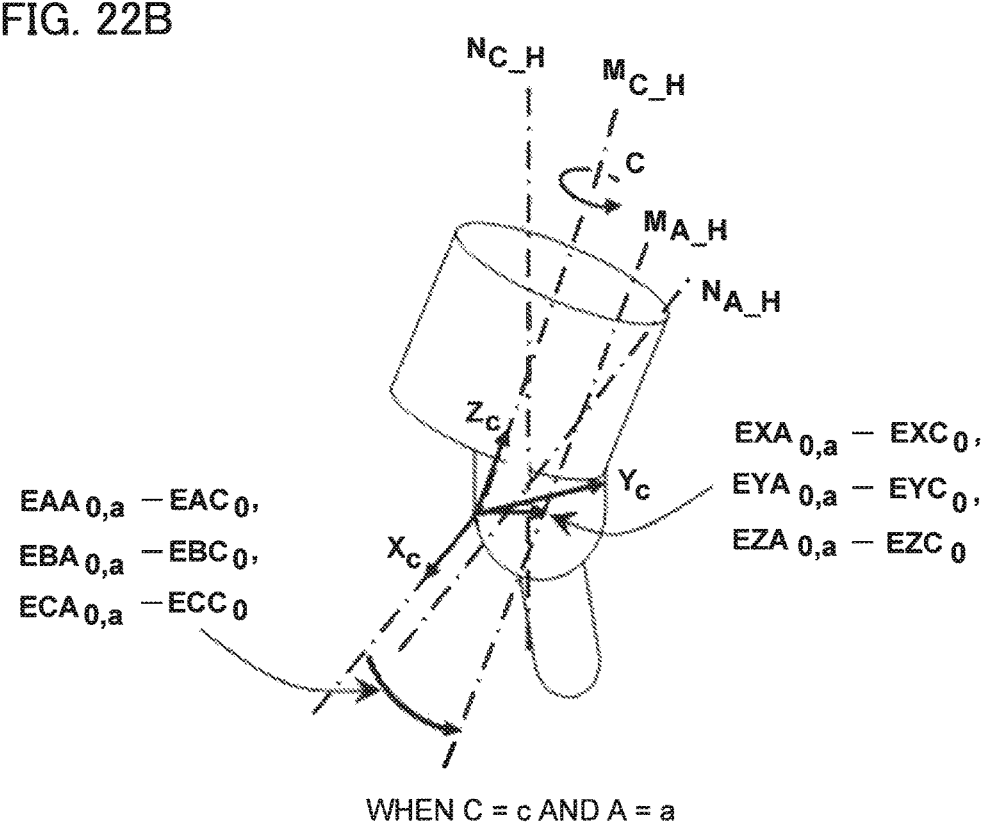
FIG. 22B is a view illustrating the translation error and rotation error dependent on the A-axis when seen from the C-axis coordinate system (when the A-axis is fixed at the arbitrary angle a and a change is made for the C-axis to the angle c other than 0 degrees)

When the A-axis is fixed at the angle a and a change is made for the C-axis to the angle c other than 0 degrees as shown in FIG. 22B, the C-axis coordinate system $X_c Y_c Z_c$ and the misaligned A-axis rotation center line $M_{A\_H}$ when C=0 and A=a move simultaneously together with the C-axis. Therefore, even if a change is made for the C-axis to the angle c other than 0 degrees, the translation error and rotation error dependent on the A-axis when seen from the C-axis coordinate system are the same as when C=0 and A=a at "$EXA_{0,a}$-$EXC_0$," "$EYA_{0,a}$-$EYC_0$," "$EZA_{0,a}$-$EZC_0$," "$EAA_{0,a}$-$EAC_0$," "$EBA_{0,a}$-$EBC_0$," and "$ECA_{0,a}$-$ECC_0$."

<6> on Necessary Measurement Data

Figure 23A:
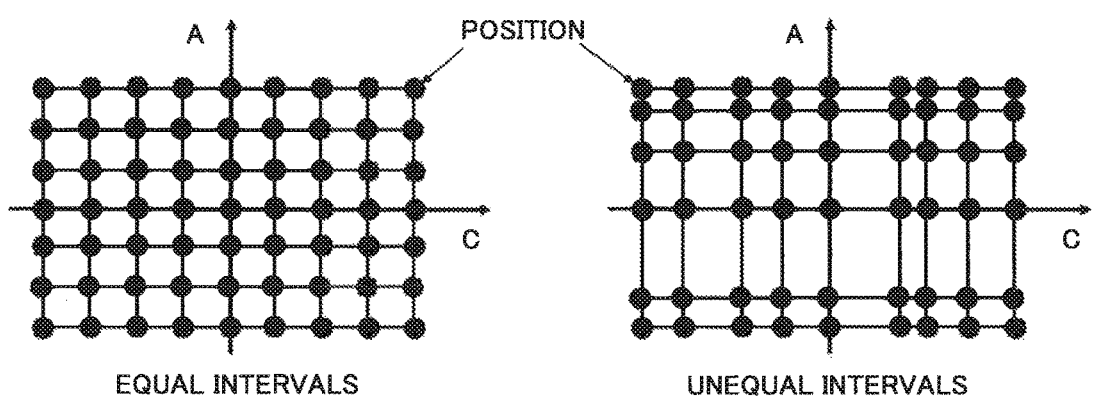
FIG. 23A is a view showing each position at which a two-dimensional coordinate system space with two rotation axes is divided at equal intervals or unequal intervals in each axis direction.
Figure 23B:
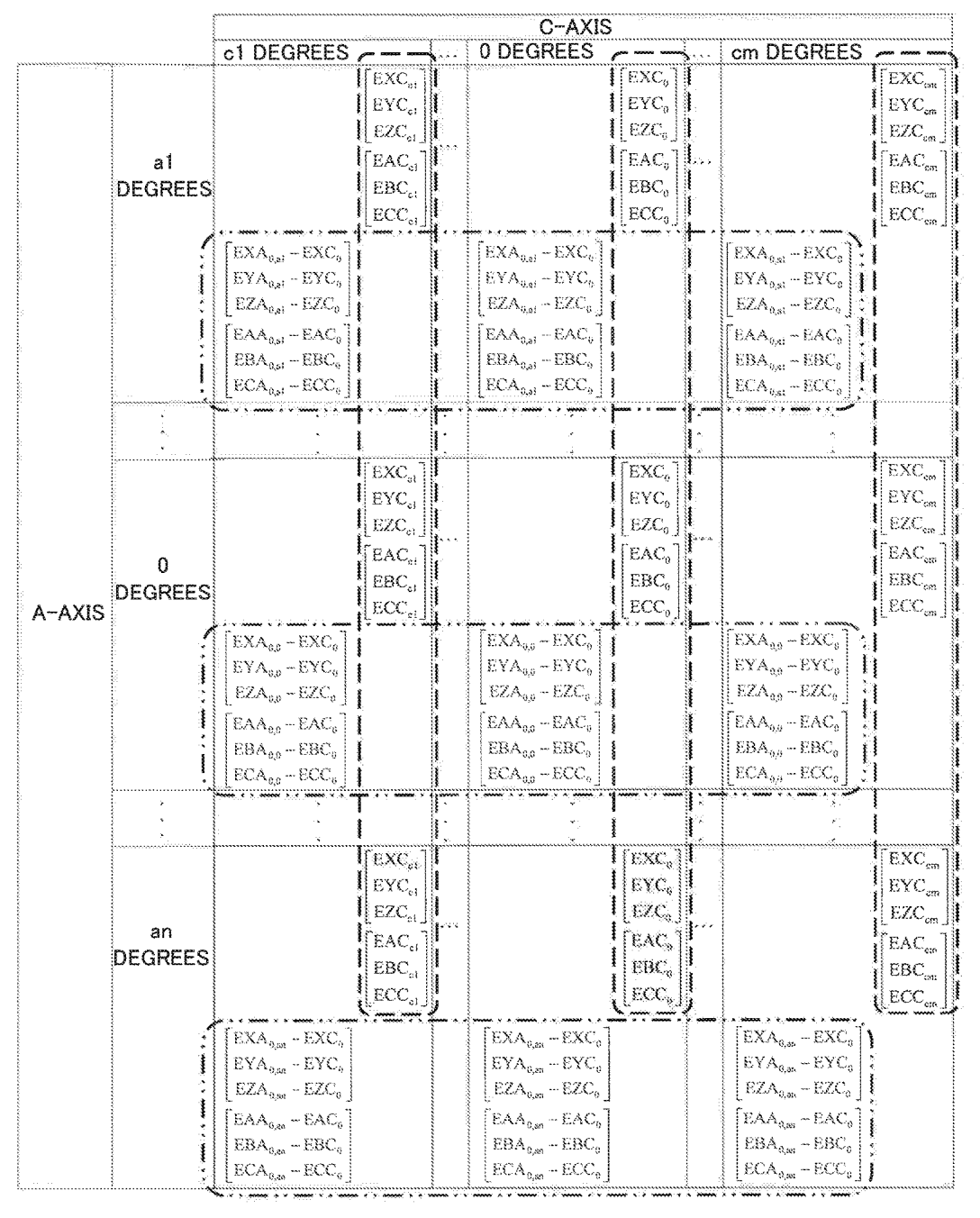

FIG. 23A shows each position at which a two-dimensional coordinate system space with two rotation axes is divided at equal intervals or unequal intervals in each axis direction. Combination of the translation error and rotation error dependent on the C-axis for each position of division and the translation error and rotation error dependent on the A-axis when seen from the C-axis coordinate system is shown in FIG. 23B. A column (for respective positions where the C-axis positions are the same) in FIG. 23B shows the translation error and rotation error dependent on the C-axis for each position where the C-axis positions are the same and the translation error and rotation error dependent on the A-axis when seen from the C-axis coordinate system where the C-axis positions are the same. A row (for respective positions where the A-axis positions are the same) in FIG. 23B shows the translation error and rotation error dependent on the C-axis for each position where the A-axis positions are the same and the translation error and rotation error dependent on the A-axis when seen from the C-axis coordinate system where the A-axis positions are the same.

Figure 24A:
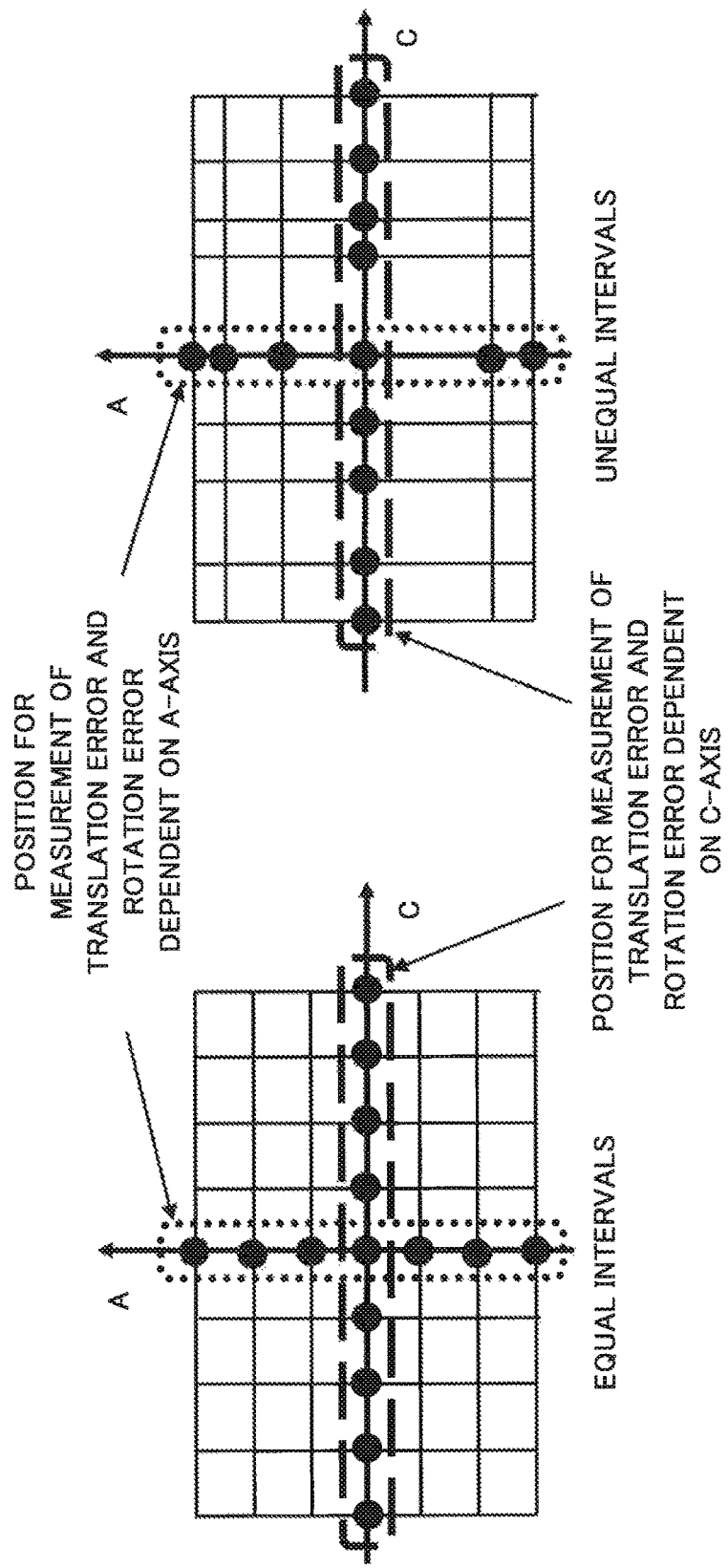
FIG. 24A is a view illustrating each position for measurement of error.
Figures 24B, 25:
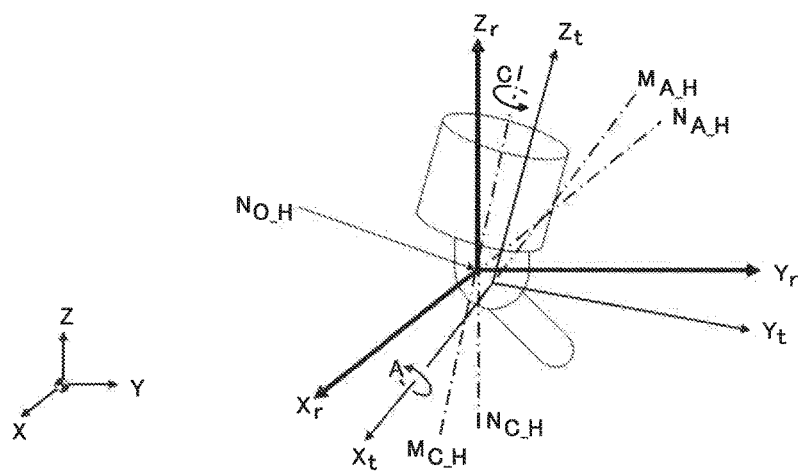
FIG. 24B is a view illustrating measurement data with respect to the C-axis and A-axis for each position for measurement of error.
FIG. 25 is a view illustrating the definition of the coordinate system and the positive direction of rotation for obtaining at least one of the translation error correction amount and rotation error correction amount dependent on the rotation axis.

From FIGS. 23A and 23B, necessary measurement data as shown in FIGS. 24A and 24B is obtained. It is necessary to measure the translation error ($EXC_c$, $EYC_c$, $EZC_c$) and rotation error ($EAC_c$, $EBC_c$, $ECC_c$) (within a frame in broken line in FIG. 24B) dependent on the C-axis for the respective positions (within a frame in broken line in FIG. 24A) where A=0 and C=c, and it is necessary to measure the translation error ($EXA_{0,a}$, $EYA_{0,a}$, $EZA_{0,a}$) and the rotation error ($EAA_{0,a}$, $EBA_{0,a}$, $ECA_{0,a}$) (within a frame in dotted line in FIG. 24B) dependent on the A-axis for the respective positions (within a frame in dotted line in FIG. 24A) where C=0 and A=a, among the respective positions of division as shown in FIG. 23A. The arithmetic measurement data input unit 21 (see FIG. 15) performs input of the necessary measurement data.

<7> on Translation Error Correction Amount and Rotation Error Correction Amount Dependent on Rotation Axis In order to obtain at least one of the translation error correction amount and rotation error correction amount dependent on the rotation axis, the following coordinate system and positive direction of rotation are defined as in FIG. 25. The reference coordinate system $X_rY_rZ_r$ (stationary coordinate system) of which the origin is the intersection of the nominal A-axis rotation center line and the nominal C-axis rotation center line and the X, Y, and Z directions are the same as in the machine coordinate system is defined. In the same manner as for the definition of the C-axis coordinate system, a tool coordinate system $X_tY_tZ_t$ (moving coordinate system) fixed to the A-axis that is the rotation axis is defined. The counterclockwise direction of rotation when seen from the terminal side of the rotating coordinate axis is the positive direction of rotation of the rotation axis.

By performing the following transformations [1] to [6] in order with the reference coordinate system $X_rY_rZ_r$, the tool coordinate system $X_tY_tZ_t$ in which a change is made to c for the C-axis as the rotation axis and to a for the A-axis as the rotation axis is obtained.

[1] Rotation by $EAC_c$, $EBC_c$, and $ECC_0$ about the $X_r$-, $Y_r$-, and $Z_r$-axes, with the reference coordinate system $X_rY_rZ_r$ set as the reference coordinate system.

[2] Translation by $EXC_c$, $EYC_c$, and $EZC_c$ along the $X_r$-, $Y_r$-, and $Z_r$-axes (resulting in the coordinate system $X_1Y_1Z_1$), with the reference coordinate system $X_rY_rZ_r$ set as the reference coordinate system.

[3] Rotation by c about $Z_1$ (resulting in the C-axis coordinate system $X_cY_cZ_c$), with the coordinate system $X_1Y_1Z_1$ set as the reference coordinate system.

[4] Rotation by $EAA_{0,a}$-$EAC_0$, $EBA_{0,a}$-$EBC_0$, and $ECA_{0,a}$-$ECC_0$ about the $X_c$-axis, the $Y_c$-axis, and the $Z_c$-axis, with the C-axis coordinate system $X_cY_cZ_c$ set as the reference coordinate system.

[5] Translation by $EXA_{0,a}$-$EXC_0$, $EYA_{0,a}$-$EYC_0$, and $EZA_{0,a}$-$EZC_0$ along the $X_c$-axis, the $Y_c$-axis, and the $Z_c$-axis (resulting in the coordinate system $X_2Y_2Z_2$), with the C-axis coordinate system $X_cY_cZ_c$ set as the reference coordinate system.

[6] Rotation by a about the $X_2$-axis (resulting in the tool coordinate system $X_tY_tZ_t$), with the coordinate system $X_2Y_2Z_2$ set as the reference coordinate system.

With the transformations described above, a homogenous coordinate transformation matrix $^rT_t$ for the reference coordinate system $X_rY_rZ_r$ to the tool coordinate system $X_tY_tZ_t$ is obtained by the following expression (5).

$$^rT_t = {^rT_1}\,{^1T_c}\,{^cT_2}\,{^2T_t} \tag{5}$$

$^rT_1$: Homogenous coordinate transformation matrix for reference coordinate system XrYrZr to coordinate system $X_1Y_1Z_1$ $^1T_c$: Homogenous coordinate transformation matrix for coordinate system $X_1Y_1Z_1$ to C-axis coordinate system $X_cY_cZ_c$ $^cT_2$: Homogenous coordinate transformation matrix for C-axis coordinate system $X_cY_cZ_c$ to coordinate system $X_2Y_2Z_2$ $^2T_t$: Homogenous coordinate transformation matrix for coordinate system $X_2Y_2Z_2$ to tool coordinate system $X_tY_tZ_t$ When the translation errors and rotation errors dependent on the C- and A-axes are taken into consideration, the actual position of the tool in the reference coordinate system $X_rY_rZ_r$ is as in expression (6).

$$^r p = {^rT_t}(^r\tilde{T}_t)^{-1}\,^r\tilde{p}$$

$$= \begin{bmatrix} 1 & -\gamma & \beta & \delta X \\ \gamma & 1 & -\alpha & \delta Y \\ -\beta & \alpha & 1 & \delta Z \\ 0 & 0 & 0 & 1 \end{bmatrix} {^r\tilde{p}}$$

$\delta X = EXC_c + (EXA_{0,a} - EXC_0)\cos(c) - (EYA_{0,a} - EYC_0)\sin(c)$ $\delta Y = EYC_c + (EYA_{0,a} - EYC_0)\cos(c) + (EXA_{0,a} - EXC_0)\sin(c)$ $\delta Z = EZC_c + (EZA_{0,a} - EZC_0)$ $\alpha = EAC_c + (EAA_{0,a} - EAC_0)\cos(c) - (EBA_{0,a} - EBC_0)\sin(c)$ $\beta = EBC_c + (EBA_{0,a} - EBC_0)\cos(c) + (EAA_{0,a} - EAC_0)\sin(c)$ $\gamma = ECC_c + (ECA_{0,a} - ECC_0)$ $^r p$: Correct position of tool head in reference coordinate system $X_rY_rZ_r$ $^r\tilde{p}$: Actual position of tool head in reference coordinate system $X_rY_rZ_r$ $^r\tilde{T}_t$: Homogenous coordinate transformation matrix for reference coordinate system $X_rY_rZ_r$ to tool coordinate system $X_tY_tZ_t$ when two rotation axes are without error (6)

When the translation error correction amount and rotation error correction amount dependent on the rotation axis are such that an X component $\Delta X2_{c,a}$, a Y component $\Delta Y2_{c,a}$, and a Z component $\Delta Z2_{c,a}$ of the translation error correction amount for movement of the rotation axis when C=c and A=a are sufficiently small and a tilt $\Delta I2_{c,a}$ about the X-axis, a tilt $\Delta J2_{c,a}$ about the Y-axis, and a tilt $\Delta K2_{c,a}$ about the Z-axis of the rotation error correction amount for movement of the rotation axis when C=c and A=a are sufficiently small, a transformation matrix with the correction amounts is expression (7).

$$\begin{bmatrix} 1 & 0 & 0 & \Delta X2_{c,a} \\ 0 & 1 & 0 & 0 \\ 0 & 0 & 1 & 0 \\ 0 & 0 & 0 & 1 \end{bmatrix} \begin{bmatrix} 1 & 0 & 0 & 0 \\ 0 & 1 & 0 & \Delta Y2_{c,a} \\ 0 & 0 & 1 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & \Delta Z2_{c,a} \\ 0 & 0 & 0 & 1 \end{bmatrix} \quad (7)$$

$$\begin{bmatrix} 1 & 0 & 0 & 0 \\ 0 & \cos(\Delta I2_{c,a}) & -\sin(\Delta I2_{c,a}) & 0 \\ 0 & \sin(\Delta I2_{c,a}) & \cos(\Delta I2_{c,a}) & 0 \\ 0 & 0 & 0 & 1 \end{bmatrix}$$

$$\begin{bmatrix} \cos(\Delta J2_{c,a}) & 0 & \sin(\Delta J2_{c,a}) & 0 \\ 0 & 1 & 0 & 0 \\ -\sin(\Delta J2_{c,a}) & 0 & \cos(\Delta J2_{c,a}) & 0 \\ 0 & 0 & 0 & 1 \end{bmatrix}$$

$$\begin{bmatrix} \cos(\Delta K2_{c,a}) & -\sin(\Delta K2_{c,a}) & 0 & 0 \\ \sin(\Delta K2_{c,a}) & \cos(\Delta K2_{c,a}) & 0 & 0 \\ 0 & 0 & 1 & 0 \\ 0 & 0 & 0 & 1 \end{bmatrix}$$

$$\begin{bmatrix} 1 & -\Delta K2_{c,a} & \Delta J2_{c,a} & \Delta X2_{c,a} \\ \Delta K2_{c,a} & 1 & -\Delta I2_{c,a} & \Delta Y2_{c,a} \\ -\Delta J2_{c,a} & \Delta I2_{c,a} & 1 & \Delta Z2_{c,a} \\ 0 & 0 & 0 & 1 \end{bmatrix}$$

Assuming that the transformation matrix in expression (6) and expression (7) are equal, the following expression (8) is obtained.

$\Delta X2_{c,a} = EXC_c + (EXA_{0,a} - EXC_0)\cos(c) - (EYA_{0,a} - EYC_0)\sin(c)$ $\Delta Y2_{c,a} = EYC_c + (EZC_{0,c} - EYC_0)\cos(c) + (EXA_{0,c} - EXC_0)\sin(c)$ $\Delta Z2_{c,a} = EZC_c + (EZA_{0,a} - EZC_0)$ $\Delta I2_{c,a} = EAC_c + (EAA_{0,a} - EAC_0)\cos(c) - (EBA_{0,a} - EBC_0)\sin(c)$ $\Delta J2_{c,a} = EBC_c + (EBA_{0,a} - EBC_0)\cos(c) + (EAA_{0,a} - EAC_0)\sin(c)$ $\Delta K2_{c,a} = ECC_c + (ECA_{0,a} - ECC_0)$ \hfill (8)

Since correction is performed to compensate for an error in the tool head, a value of the error in the tool head with an inverted sign from expression (8) is the correction amount (see the following expression (9)).

$\Delta X2_{c,a} = -EXC_c - (EXA_{0,a} - EXC_0)\cos(c) + (EYA_{0,a} - EYC_0)\sin(c)$ $\Delta Y2_{c,a} = -EYC_c - (EZA_{0,a} - EYC_0)\cos(c) - (EXA_{0,a} - EXC_0)\sin(c)$ $\Delta Z2_{c,a} = -EZC_c - (EZA_{0,a} - EZC_0)$ $\Delta I2_{c,a} = -EAC_c - (EAA_{0,a} - EAC_0)\cos(c) + (EBA_{0,a} - EBC_0)\sin(c)$ $\Delta J2_{c,a} = -EBC_c - (EBA_{0,a} - EBC_0)\cos(c) - (EAA_{0,a} - EAC_0)\sin(c)$ $\Delta K2_{c,a} = -ECC_c - (ECA_{0,a} - ECC_0)$ \hfill (9)

While the translation error correction amount and rotation error correction amount dependent on the rotation axis are obtained simultaneously in expression (9), only one of the translation error correction amount and rotation error correction amount dependent on the rotation axis may be obtained. That is, it may be such that only one of the translation error correction amount dependent on the rotation axis and the rotation error correction amount dependent on the rotation axis is obtained by the calculation described above.

For "<8> On input of translation error correction amount and rotation error correction amount" and thereafter, it is similar to the first embodiment, and therefore description is omitted.

What is claimed is:

1. An error correction amount creating device that creates an error correction amount for a five-axis machine controlled by a numerical controller and having three linear axes and two rotation axes, the error correction amount creating device comprising:
   for said two rotation axes of a first axis and a second axis,
      a measurement data input unit that inputs, as arithmetic measurement data,
         a translation error and rotation error at respective positions divided at equal or unequal intervals for the second rotation axis, measured by a measuring machine, when the first axis is fixed at an arbitrary angle, and
         a translation error and rotation error at respective positions divided at equal or unequal intervals for the first rotation axis, measured by the measuring machine, when the second axis is fixed at an arbitrary angle,
      wherein, when one of said two rotation axes is fixed at an arbitrary angle, the translation error and rotation errors at the respective positions in the fixed axis are all the same, and
   an error correction amount arithmetic unit that obtains, from the arithmetic measurement data, at least one of a rotation axis-dependent translation error correction amount that is a translation error correction amount and a rotation axis-dependent rotation error correction amount that is a rotation error correction amount, for each lattice point of a lattice region into which a two-dimensional coordinate system space with the two rotation axes is divided at the equal intervals or unequal intervals in each axis direction; and
   an error correction amount output unit that outputs at least one of the rotation axis-dependent translation error correction amount and the rotation axis-dependent rotation error correction amount to the numerical controller controlling the five-axis machine.

2. The error correction amount creating device according to claim 1, which is a device independent from the numerical controller.

3. The error correction amount creating device according to claim 1, which is a device present within the numerical controller.

4. The error correction amount creating device according to claim 1, wherein the five-axis machine is a table rotating five-axis machine in which a table is rotated about the two rotation axes.

5. The error correction amount creating device according to claim 1, wherein the five-axis machine is a head rotating five-axis machine in which a head is rotated about the two rotation axes.

* * * * *